(12) United States Patent
Okigami et al.

(10) Patent No.: US 9,075,554 B2
(45) Date of Patent: *Jul. 7, 2015

(54) COMMUNICATION SYSTEM, COMMUNICATION METHOD, AND IMAGE FORMING APPARATUS

(71) Applicant: SHARP KABUSHIKI KAISHA, Osaka-Shi, Osaka (JP)

(72) Inventors: Masafumi Okigami, Osaka (JP); Masanori Matsumoto, Osaka (JP)

(73) Assignee: SHARP KABUSHIKI KAISHA, Osaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,665

(22) Filed: Aug. 5, 2013

(65) Prior Publication Data

US 2013/0314747 A1 Nov. 28, 2013

Related U.S. Application Data

(62) Division of application No. 13/904,946, filed on May 29, 2013, which is a division of application No. 12/660,825, filed on Mar. 3, 2010, now abandoned.

(30) Foreign Application Priority Data

| Mar. 3, 2009 | (JP) | 2009-049652 |
| Mar. 13, 2009 | (JP) | 2009-061761 |

(51) Int. Cl.
*G06F 3/12* (2006.01)
*G06K 15/00* (2006.01)
(Continued)

(52) U.S. Cl.
CPC .......... *G06F 3/1292* (2013.01); *H04L 63/0492* (2013.01); *H04L 63/10* (2013.01);
(Continued)

(58) Field of Classification Search
USPC .............. 358/1.14, 1.15; 348/207.2; 715/765, 715/783, 710, 835, 838, 846
See application file for complete search history.

(56) References Cited

U.S. PATENT DOCUMENTS 7,139,827 B1 11/2006 Iwayama et al.
7,218,644 B1 5/2007 Heinonen et al.
(Continued)

FOREIGN PATENT DOCUMENTS

CN 1309501 A 8/2001
CN 1657299 A 5/2003
(Continued)

OTHER PUBLICATIONS

Telefonaktiebolaget LM Ericsson et al., Specification of the Bluetooth System, V1.0 A, Jul. 26, 1999, 1068 pages (retrieved from http://www.ece.virginia.edu/~mv/standards/Bluetooth_core_10_a.pdf).

(Continued)

*Primary Examiner* — Fred Guillermety
(74) *Attorney, Agent, or Firm* — Birch, Stewart, Kolasch & Birch, LLP

(57) ABSTRACT

In a communication system, an image forming apparatus sends an address of a receiving section to a mobile terminal. The mobile terminal receives a selection of an image data among plural thumbnails displayed on a display section, and wirelessly sends the selected image data to the image forming apparatus with the address. The image forming apparatus receives the selected image data sent with the address by the mobile terminal, and prints an image based on the selected image data. A communication between the mobile terminal and the image forming apparatus is performed wirelessly with an IEEE 802.11 standard. The image forming apparatus rejects a connection establishment request from another mobile terminal except for the mobile terminal, when the wireless communication with the mobile terminal is established.

7 Claims, 12 Drawing Sheets

(51) Int. Cl.

| | | |
|---|---|---|
| *H04L 29/06* | (2006.01) | |
| *H04N 1/00* | (2006.01) | |
| *H04W 76/02* | (2009.01) | |
| *H04L 29/08* | (2006.01) | |
| *H04M 1/725* | (2006.01) | |
| *H04W 8/20* | (2009.01) | |
| *H04W 8/26* | (2009.01) | |
| *H04W 92/18* | (2009.01) | |

(52) U.S. Cl.
CPC ........ *H04M 1/7253* (2013.01); *H04N 1/00307* (2013.01); *H04N 2201/0015* (2013.01); *H04N 2201/0043* (2013.01); *H04N 2201/0046* (2013.01); *H04N 2201/0055* (2013.01); *H04N 2201/0094* (2013.01); *H04W 8/20* (2013.01); *H04W 8/26* (2013.01); *H04W 76/027* (2013.01); *H04W 92/18* (2013.01); *H04L 67/14* (2013.01); *G06F 3/1285* (2013.01); *G06F 3/1286* (2013.01); *G06F 3/1211* (2013.01); *G06F 3/1236* (2013.01)

(56) References Cited

U.S. PATENT DOCUMENTS

| | | |
|---|---|---|
| 2001/0041056 A1 | 11/2001 | Tanaka et al. |
| 2002/0038372 A1 | 3/2002 | Idehara et al. |
| 2003/0093675 A1 | 5/2003 | Hibino et al. |
| 2003/0129970 A1 | 7/2003 | Kawaoka |
| 2004/0078169 A1 | 4/2004 | Oba et al. |
| 2004/0214524 A1 | 10/2004 | Noda et al. |
| 2004/0259499 A1 | 12/2004 | Oba et al. |
| 2005/0128968 A1 | 6/2005 | Yang |
| 2005/0141040 A1 | 6/2005 | Yamada et al. |
| 2005/0219556 A1 | 10/2005 | Lee et al. |
| 2005/0275864 A1 | 12/2005 | Sugimura et al. |
| 2006/0007485 A1 | 1/2006 | Miyazaki |
| 2006/0044601 A1 | 3/2006 | Misawa et al. |
| 2006/0092971 A1 | 5/2006 | Okita et al. |
| 2006/0223394 A1 | 10/2006 | Porat |
| 2007/0140268 A1 | 6/2007 | Ge et al. |
| 2007/0153320 A1 | 7/2007 | Yamaoka |
| 2007/0174515 A1 | 7/2007 | Sinclair et al. |
| 2007/0201073 A1 | 8/2007 | Masumoto |
| 2007/0201084 A1 | 8/2007 | Tokumaru et al. |
| 2007/0206225 A1 | 9/2007 | Shinohara et al. |
| 2007/0220255 A1 | 9/2007 | Igarashi |
| 2007/0297017 A1 | 12/2007 | Kashioka |
| 2008/0088876 A1 | 4/2008 | Tanaka et al. |
| 2008/0231890 A1 | 9/2008 | Kishi |
| 2008/0239382 A1 | 10/2008 | Matsueda |
| 2008/0252917 A1 | 10/2008 | Kuroda et al. |
| 2008/0287160 A1 | 11/2008 | Sasai et al. |
| 2008/0297607 A1 | 12/2008 | Minatogawa |
| 2009/0066998 A1 | 3/2009 | Kato |
| 2009/0164944 A1 | 6/2009 | Webster et al. |
| 2009/0203349 A1 | 8/2009 | Hollstien |
| 2010/0189286 A1 | 7/2010 | Katsuno |
| 2011/0261389 A1 | 10/2011 | Ohara |

FOREIGN PATENT DOCUMENTS

| | | |
|---|---|---|
| CN | 1657299 A | 8/2005 |
| CN | 1722762 A | 1/2006 |
| CN | 1767500 A | 5/2006 |
| CN | 101005399 A | 7/2007 |
| CN | 101005432 A | 7/2007 |
| CN | 101030960 A | 9/2007 |
| CN | 101094301 A | 12/2007 |
| CN | 101207412 A | 6/2008 |
| JP | 2001-249878 A | 9/2001 |
| JP | 2001-306827 A | 11/2001 |
| JP | 2002-112336 A | 4/2002 |
| JP | 2003-30201 A | 1/2003 |
| JP | 2003-032176 A | 1/2003 |
| JP | 2003-46673 A | 2/2003 |
| JP | 2003-85659 A | 3/2003 |
| JP | 2003-0110579 A | 4/2003 |
| JP | 2003-203036 A | 7/2003 |
| JP | 2003-309694 A | 10/2003 |
| JP | 2003-3244446 A | 11/2003 |
| JP | 2004-56525 A | 2/2004 |
| JP | 2004-350239 A | 12/2004 |
| JP | 2004-357182 A | 12/2004 |
| JP | 2005-101932 A | 4/2005 |
| JP | 2005-167946 A | 6/2005 |
| JP | 2006-42104 A | 2/2006 |
| JP | 2006-191440 A | 7/2006 |
| JP | 2006-287860 A | 10/2006 |
| JP | 2007-249425 A | 9/2007 |
| JP | 2007-267362 A | 10/2007 |
| JP | 2007-267370 A | 10/2007 |
| JP | 2008-148053 A | 6/2008 |
| JP | 2008-198015 A | 8/2008 |
| JP | 2008-271150 A | 11/2008 |
| JP | 2009-037591 A | 2/2009 |
| WO | WO 03/034660 A1 | 4/2003 |
| WO | WO 2009-020082 A1 | 2/2009 |

OTHER PUBLICATIONS

US Office Action for U.S. Appl. No. 12/655,997, dated Dec. 19, 2012.
US Office Action for U.S. Appl. No. 12/655,997, dated Jul. 27, 2012.
US Office Action for U.S. Appl. No. 12/659,503, dated Feb. 19, 2013.
US Office Action for U.S. Appl. No. 12/659,503, dated Jun. 3, 2013 (Advisory Action).
US Office Action for U.S. Appl. No. 12/659,503, dated Oct. 19, 2012.
US Office Action for U.S. Appl. No. 12/660,825, dated Feb. 13, 2013.
US Office Action for U.S. Appl. No. 12/660,825, dated May 20, 2013 (Advisory Action).
US Office Action for U.S. Appl. No. 12/660,825, dated Oct. 1, 2012.
US Office Action for U.S. Appl. No. 13/865,667, dated Sep. 10, 2013.
US Office Action for U.S. Appl. No. 13/904,946, dated Sep. 20, 2013.
US Office Action for U.S. Appl. No. 13/907,583, dated Sep. 18, 2013.
US Office Action for U.S. Appl. No. 13/952,548, dated Sep. 17, 2013.
US Office Action for U.S. Appl. No. 13/952,549, dated Sep. 12, 2013.
US Office Action for U.S. Appl. No. 13/959,672, dated Sep. 23, 2013.
US Office Action for U.S. Appl. No. 13/959,549, dated Oct. 23, 2013.
US Office Action for U.S. Appl. No. 13/959,668, dated Oct. 24, 2013.
US Office Action for U.S. Appl. No. 13/865,667 dated Feb. 13, 2014.
US Office Action for U.S. Appl. No. 13/904,946 dated Feb. 13, 2014.
US Office Action for U.S. Appl. No. 13/907,583 dated Feb. 20, 2014.
US Office Action for U.S. Appl. No. 13/952,548 dated Feb. 14, 2014.
US Office Action for U.S. Appl. No. 13/952,549 dated Feb. 20, 2014.
US Office Action for U.S. Appl. No. 13/959,549 dated Feb. 20, 2014.
US Office Action for U.S. Appl. No. 13/959,668 dated Feb. 13, 2014.
US Office Action for U.S. Appl. No. 13/959,672 dated Feb. 13, 2014.
US Office Action for U.S. Appl. No. 13/865,667, dated May 16, 2014 (Advisory Action).
US Office Action for U.S. Appl. No. 13/904,946, dated Aug. 1, 2014.
US Office Action for U.S. Appl. No. 13/904,946, dated May 20, 2014 (Advisory Action).
US Office Action for U.S. Appl. No. 13/907,583, dated Jul. 2, 2014 (Advisory Action).
US Office Action for U.S. Appl. No. 13/952,548, dated Jul. 31, 2014.
US Office Action for U.S. Appl. No. 13/952,548, dated May 28, 2014 (Advisory Action).
US Office Action for U.S. Appl. No. 13/952,549, dated May 16, 2014 (Advisory Action).
US Office Action for U.S. Appl. No. 13/959,549, dated May 16, 2014 (Advisory Action).
US Office Action for U.S. Appl. No. 13/959,668, dated May 16, 2014 (Advisory Action).
US Office Action for U.S. Appl. No. 13/959,672, dated May 16, 2014 (Advisory Action).
US Office Action for U.S. Appl. No. 14/280,446, dated Aug. 13, 2014.
US Office Action for U.S. Appl. No. 14/280,497, dated Aug. 15, 2014.

(56) References Cited

OTHER PUBLICATIONS

US Communication for U.S. Appl. No. 14/280,497, dated Sep. 8, 2014 (Applicant-Initiated Interview Summary).
US Examiner's Answer to Appeal Brief for U.S. Appl. No. 13/865,667, dated Oct. 21, 2014.
US Examiner's Answer to Appeal Brief for U.S. Appl. No. 13/907,583, dated Oct. 27, 2014.
US Office Action for U.S. Appl. No. 13/952,549, dated Sep. 19, 2014.
US Office Action for U.S. Appl. No. 13/959,549, dated Sep. 19, 2014.
US Office Action for U.S. Appl. No. 13/959,668, dated Sep. 4, 2014.
US Office Action for U.S. Appl. No. 13/959,672, dated Sep. 30, 2014.
US Office Action for U.S. Appl. No. 14/280,410, dated Oct. 6, 2014.
US Office Action for U.S. Appl. No. 14/280,475, dated Oct. 6, 2014.
U.S. Office Action for U.S. Appl. No. 14/280,446 dated Dec. 31, 2014.
U.S. Office Action for U.S. Appl. No. 14/280,492 dated Dec. 17, 2014.
Symbian Freak, "Bluetooth Pearsonal Area Network (PAN) Guide—Needed," May 18, 2008, pp. 1-8, https://www.symbian-freak.com/forum/viewtopic.php?p=233846.
US Office Action, dated Feb. 23, 2015, for U.S. Appl. No. 13/959,549 (Advisory Action).
US Office Action, dated Feb. 5, 2015, for U.S. Appl. No. 13/959,668 (Advisory Action).
US Office Action, dated Mar. 18, 2015, for U.S. Appl. No. 14/280,497.
US Office Action, dated Mar. 2, 2015, for U.S. Appl. No. 13/959,672 (Advisory Action).
US Office Action, dated Mar. 25, 2015, for U.S. Appl. No. 14/280,492.
US Office Action, dated Mar. 26, 2015, for U.S. Appl. No. 13/904,946.
US Office Action, dated Mar. 27, 2015, for U.S. Appl. No. 13/952,548.

F I G. 10
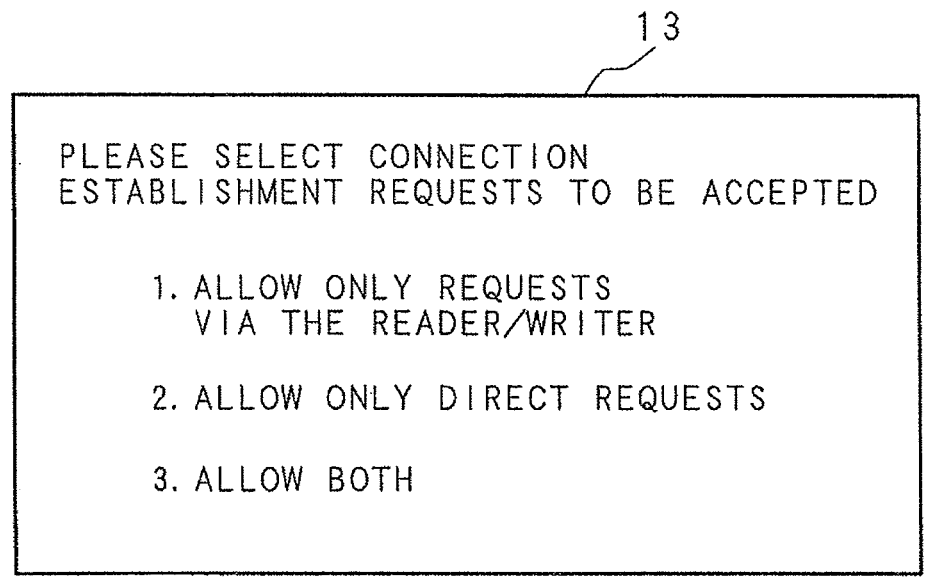

COMMUNICATION SYSTEM, COMMUNICATION METHOD, AND IMAGE FORMING APPARATUS

CROSS-REFERENCE TO RELATED APPLICATION

This application is a divisional U.S. application Ser. No. 13/904,946, filed May 29, 2013, which is a divisional of U.S. application Ser. No. 12/660,825, filed Mar. 3, 2010, which claims priority under 35 U.S.C. §119(a) on Patent Application No. 2009-049652 filed in Japan on Mar. 3, 2009, No. 2009-061761 filed in Japan on Mar. 13, 2009, the entire contents of which are hereby incorporated by reference.

BACKGROUND

1. Technical Field

The present invention relates to a communication system having a mobile terminal and an image forming apparatus; a communication method; and an image forming apparatus.

2. Description of Related Art

In recent years, with the spread of mobile phones having a camera function, it is possible to conveniently take digital pictures anytime anywhere. Moreover, since the capacities of memories included in the mobile phones are larger, the mobile phones are increasingly used as personal storage devices for storing data, such as digital pictures and business documents. With a reduction in the size and thickness of mobile phones, a memory to be included in a mobile phone is realized by a memory about the size of a fingertip or smaller, namely a card-type memory.

Japanese Patent Application Laid-Open No. 2007-267370 discloses a wireless communication method in which when a user moves his/her noncontact ID card (or wireless communication device incorporating a noncontact ID card) close to a card reader/writer section of an image processing apparatus, an IC chip of the noncontact ID card receives weak radio waves including terminal ID indicating the ID of the image processing apparatus, which are always emitted from the card reader/writer section, obtains the terminal ID, and sends the user ID of the noncontact ID card to the image processing apparatus by using the terminal ID.

Japanese Patent Application Laid-Open No. 2003-32176 discloses a communication system in which when a user moves a mobile phone including a noncontact IC card for communicating with a reader/writer of a personal computer by means of electromagnetic waves close to the personal computer and the noncontact IC card receives electromagnetic waves radiated from the reader/writer, the mobile phone notifies the personal computer of card ID set for the noncontact IC card, and then the personal computer identifies the mobile phone on the basis of the notified card ID and recognizes it as a communication partner.

SUMMARY

According to an aspect of the present invention, a communication system has a mobile terminal and an image forming apparatus. The image forming apparatus includes a receiving section for receiving image data from the mobile terminal, and prints an image based on the received image data. The image forming apparatus comprises a sending section that sends an address of the receiving section to the mobile terminal. The image forming apparatus makes the receiving section receive image data sent with the address by the mobile terminal. A communication between the mobile terminal and the image forming apparatus is performed wirelessly with an IEEE 802.11 standard. The mobile terminal comprises a data selection receiving section that receives a selection of an image data among plural thumbnails displayed on a display section, and an image data sending section that wirelessly sends the selected image data to the image forming apparatus with the address. The image forming apparatus receives the selected image data by the receiving section when the selected image data is sent with the address from the mobile terminal. The image forming apparatus rejects a connection establishment request from another mobile terminal except for the mobile terminal, when the wireless communication with the mobile terminal is established.

The above and further objects and features of the invention will more fully be apparent from the following detailed description with accompanying drawings.

BRIEF DESCRIPTION OF THE SEVERAL VIEWS OF THE DRAWINGS

FIG. 10 is an exemplary view illustrating one example of a connection selection receiving screen.

DETAILED DESCRIPTION

Figure 1:
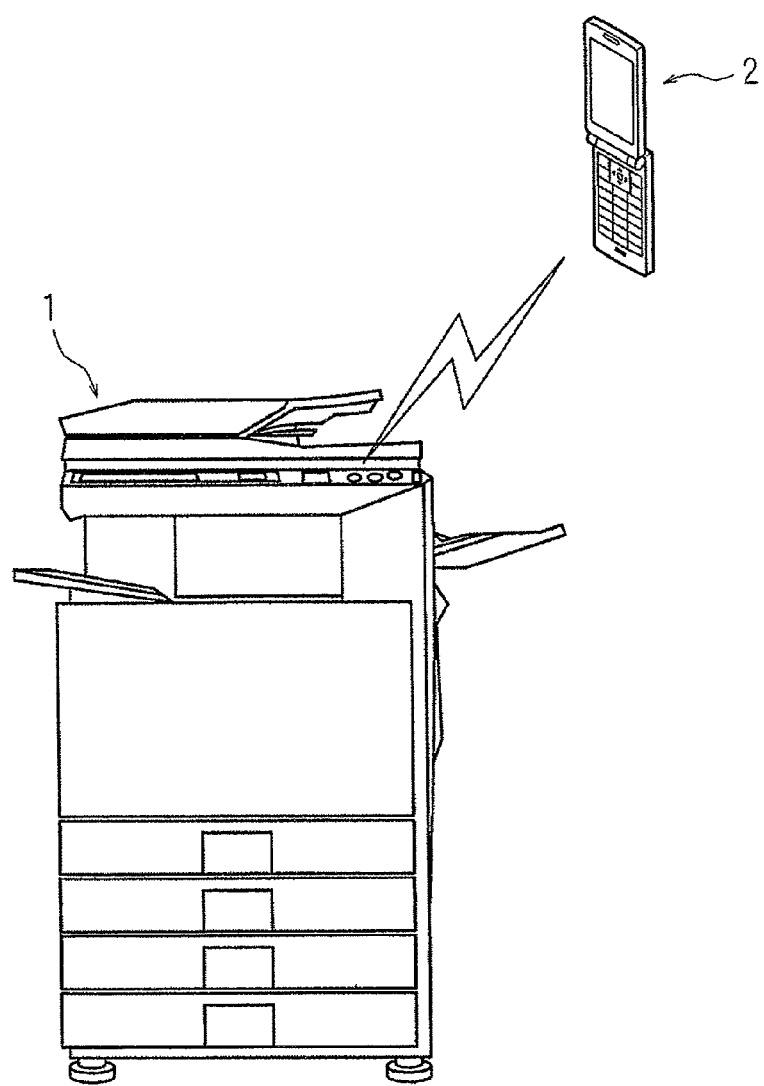
FIG. 1 is a conceptual view of a communication system, an information processing system, and an image formation system of Embodiment 1.

Referring to the drawings, the following description will specifically explain some embodiments in which an image forming apparatus (a first communication device, an information processing device) according to the present invention is applied to a digital multi-function peripheral having a copying function, a printing function etc. The following explains examples in which a communication system, an information processing system and an image formation system according to the present invention include the digital multi-function peripheral and a mobile phone (a second communication device, a communication terminal device, a mobile communication device) as components.

(Embodiment 1)

Figure 2:
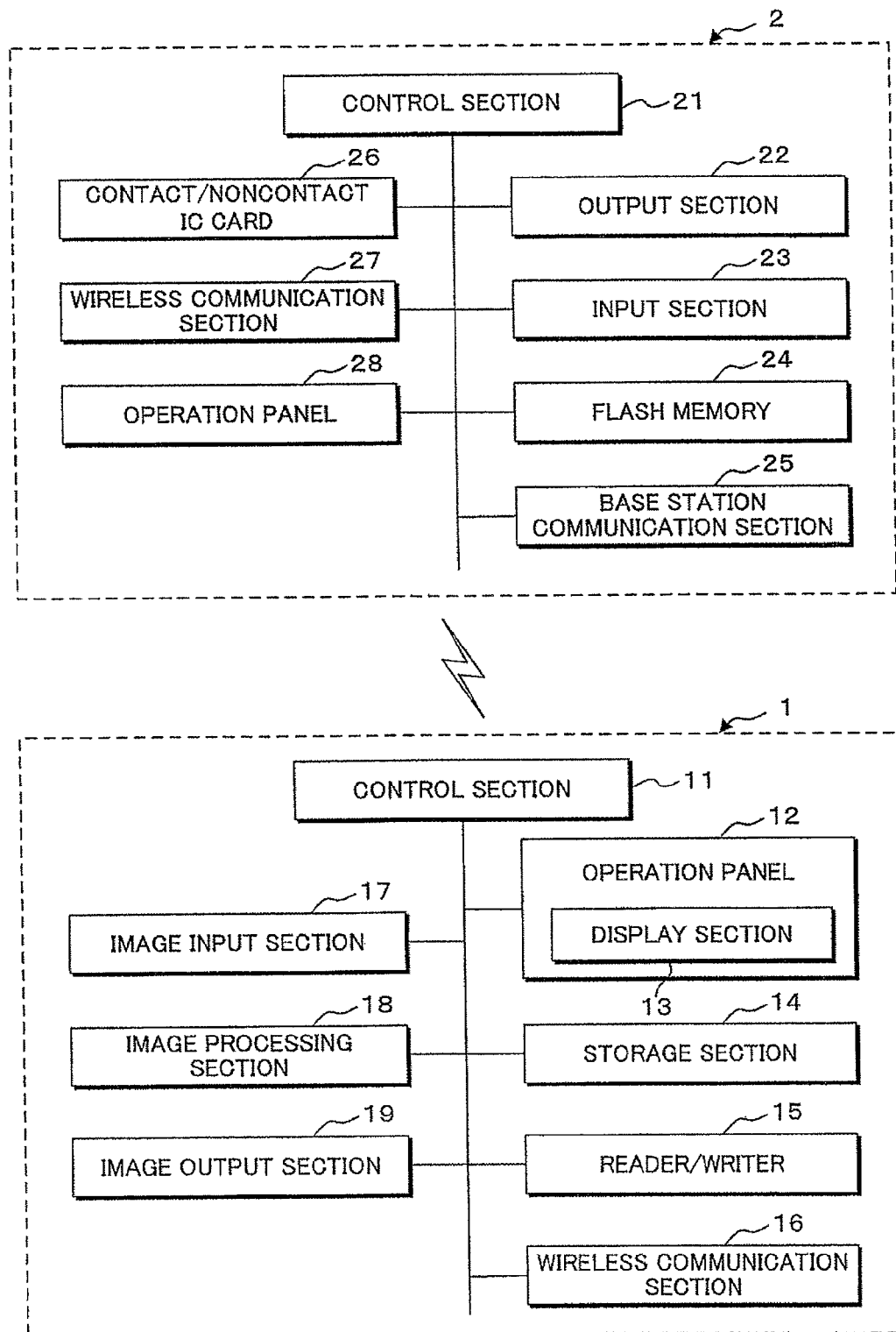
FIG. 2 is a block diagram illustrating essential structures of the communication system, the information processing system, and the image formation system of Embodiment 1.

FIG. 1 is a conceptual view of a communication system, an information processing system and an image formation system of Embodiment 1, and FIG. 2 is a block diagram illustrating essential structures of the communication system, the information processing system and the image formation system of Embodiment 1. The communication system, information processing system and image formation system of Embodiment 1 include a digital multi-function peripheral 1 and a mobile phone 2.

The digital multi-function peripheral 1 comprises hardware, such as a control section 11, an image input section 17, an image processing section 18, an image output section 19, a storage section 14, a wireless communication section 16, a reader/writer 15, and an operation panel 12 which constitute as a whole the digital multi-function peripheral.

The control section 11 includes a CPU for controlling each of the above-mentioned hardware sections, and a RAM for temporarily storing data necessary for control. For example, the storage section 14 is a non-volatile semiconductor memory and stores image data subjected to image processing, and control programs for controlling the respective hardware sections. In addition, the storage section 14 stores a program for displaying in the display section 13 various kinds of screens, such as a later-described file name list screen, and image data received through the wireless communication section 16. The storage section 14 stores a plurality of passkeys in advance. When the CPU of the control section 11 receives a passkey through the operation panel 28, 12, it compares the received passkey with the passkeys stored in the storage section 14.

The control section 11 loads a control program from the storage section 14 as the need arises, and executes the loaded control program to activate the whole device as an image forming apparatus according to the present invention.

The operation panel 12 includes various buttons for receiving instructions from users, the Enter key for receiving a confirmation of an instruction, and the ten-key. The operation panel 12 includes the display section 13, such as a liquid crystal display, and displays a file name list screen (content data) about images, documents etc. held by a mobile phone 2 with which the connection has been established. The display section 13 is configured to function as a touch panel.

The image input section 17 is reading means for optically reading an image on a document, and comprises a light source for irradiating light on a document, and an image sensor such as a CCD (Charge Coupled Device). The image input section 17 focuses a reflected light image from the document set at a given reading position onto the image sensor, and outputs analog electric signals representing RGB (R: Red, G: Green, B: Blue) from the image sensor. The analog electric signals outputted from the image input section 17 are inputted into the image processing section 18.

The image processing section 18 generates digital image data on the basis of the analog electric signals inputted from the image input section 17, performs processing according to the type of the image, and generates image data to be outputted. The generated image data is outputted to the image output section 19, or the wireless communication section 16.

The image output section 19 is an image forming section for forming an image desired by a user on a sheet by an electro-photographic method, and forms the image on the basis of the image data outputted from the image processing section 18 on a sheet of paper, OHP film etc. The image output section 19 comprises a photoreceptor drum; a charger for charging the photoreceptor drum to a given electric potential; a laser writing device for generating an electrostatic latent image on the photoreceptor drum by emitting laser light according to image data to be processed; a developing device for supplying toner to visualize the electrostatic latent image formed on the surface of the photoreceptor drum; and a transfer device (not shown) for transferring the toner image formed on the surface of the photoreceptor drum to paper. Instead of forming an image by the electro-photographic method using the laser writing device, an inkjet method, a heat-transfer method, a sublimation method etc. may be used to form the image.

The wireless communication section (first communication means, first sending/receiving means, receiving means) 16 is compatible with a Bluetooth technology, for example, and establishes wirelessly a connection with other Bluetooth compatible device (for example, a later-described wireless communication section 27) within a given short distance (for example, 100 m). More specifically, the wireless communication section 16 (Bluetooth compatible device) has a unique Bluetooth address (identification data) and is capable of connecting to and communicating with other Bluetooth compatible device by performing a process called pairing for specifying (authenticating) parties to be connected using their mutual Bluetooth address via a temporary short distance network called piconet. The piconet is automatically and actively established, or lost, when other Bluetooth compatible device comes within a range of a given distance from the wireless communication section 16, or out of the range of the given distance. The wireless communication section 16 is not limited to a Bluetooth compatible device, and may be a device capable of performing wireless communication over longer distances or at a higher rate than communication using a RFID system, such as, for example, a device compatible with IEEE802.11. In this case, however, the later-described wireless communication section 27 corresponding to the wireless communication section 16 needs to be a device compatible with IEEE802.11.

The reader/writer 15 sends/receives data in a contact/noncontact fashion to/from a later-described contact/noncontact IC card 26 by using a noncontact communication system (RFID (Radio Frequency Identification) system). The following will explain noncontact type communication between the reader/writer 15 and the contact/noncontact IC card 26. The reader/writer 15 emits an activation signal (electromagnetic wave) all the time, and when the contact/noncontact IC card 26 and the reader/writer 15 come closer to be able to communicate with each other, the contact/noncontact IC card 26 receives the electromagnetic wave emitted from the reader/writer 15. When the contact/noncontact IC card 26 receives the electromagnetic wave emitted from the reader/writer 15, it generates a DC power source by rectifying the carrier wave of the received electromagnetic wave and drives an internal circuit by using the generated DC power source. Then, the contact/noncontact IC card 26 performs amplitude modulation and sends a response signal responding to the received activation signal to the reader/writer 15. As the noncontact communication system, for example, a RFID system, such as Felica and Edy, is employed. When the reader/writer 15 receives the response signal from the contact/noncontact IC card 26, it sends the unique Bluetooth address (identification data) of the wireless communication section 16 to the contact/noncontact IC card 26.

In order for a Bluetooth compatible device to establish a connection with a party to be connected by pairing, it is usually necessary to perform time-consuming operations including searching for addresses of connectable devices within a given range and selecting and specifying a device desired to be connected from the discovered addresses. In the system of the present invention, however, such operations are not necessary when establishing a connection between the mobile phone 2 and the digital multi-function peripheral 1.

On the other hand, the mobile phone 2 comprises a control section 21, a flash memory 24, a base station communication section 25, an operation panel 28, an input section 23, an output section 22, a contact/noncontact IC card 26, and a wireless communication section 27.

The control section 21 includes a CPU for controlling the whole device, a ROM for storing programs and various kinds of data, and a RAM capable of performing high-speed writing/reading. The flash memory 24 is a large-capacity storage device and stores phone numbers, image data, listing data (content data) for displaying a list of file names of images, documents etc. held by the mobile phone 2, and thumbnails of the images.

The base station communication section 25 has a communication interface and communicates with a base station. The operation panel 28 includes operation buttons for receiving user's operations. The input section 23 is a camera for obtaining an image by photographing, a microphone for receiving an input of sounds, etc. The output section 22 is a liquid crystal monitor for outputting an image, a speaker for outputting sounds, etc.

The contact/noncontact IC card 26 sends/receives data in a contact/noncontact fashion to/from the reader/writer 15 of the digital multi-function peripheral 1 by using a so-called non-contact communication system. As described above, a RFID system, such as Felica and Edy, is employed as the communication system. Like the wireless communication section 16 of the digital multi-function peripheral 1, the wireless communication section (fourth communication means, second sending/receiving means) 27 is compatible with the Bluetooth technology. When other Bluetooth compatible device (for example, the wireless communication section 16) is within a given short distance (for example, 100 m), the wireless communication section 27 is connected to and communicates with this device in a wireless fashion.

Figure 3A:
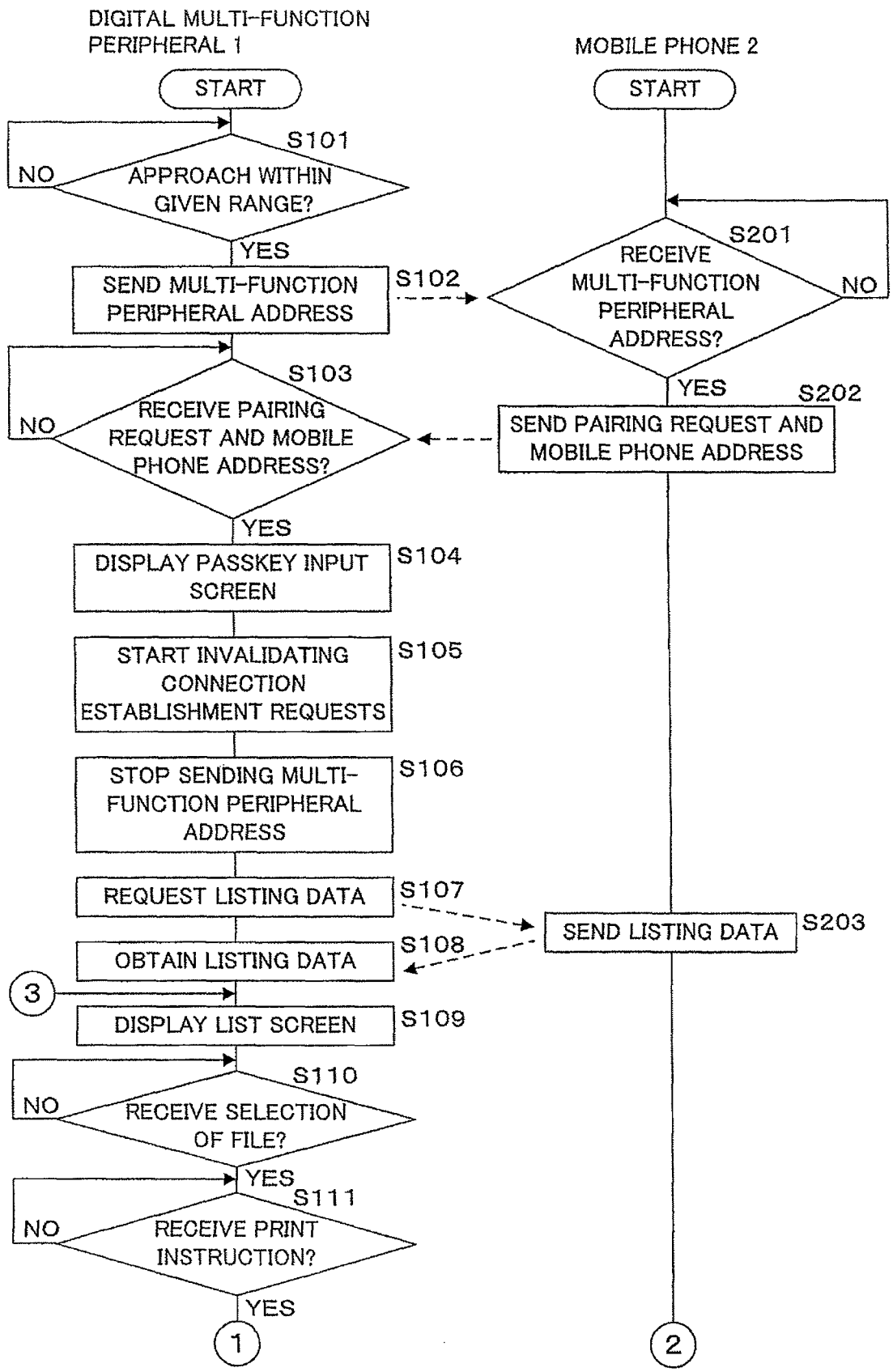
FIG. 3A and FIG. 3B are flowcharts illustrating the processing steps to be performed by CPUs in a control section of a digital multi-function peripheral and a control section of a mobile phone.
Figure 3B:
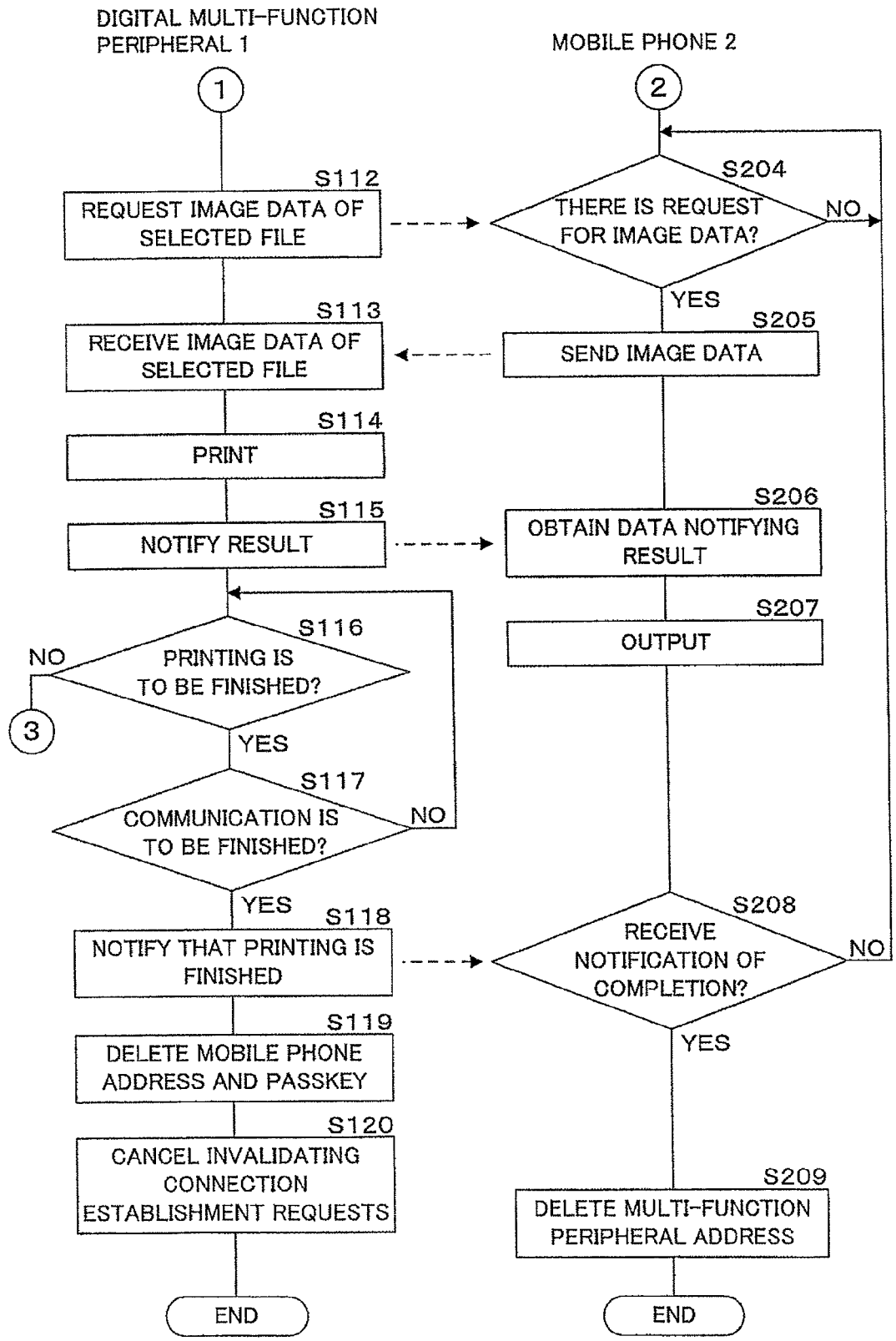

The following will explain the communication process and the image formation process to be performed by the digital multi-function peripheral 1 and the mobile phone 2 in the communication system, the information processing system and the image formation system according to Embodiment 1. Here, one example of printing an image on the basis of image data stored in a user's mobile phone 2 by the digital multi-function peripheral 1 will be explained. Note that the digital multi-function peripheral 1 is also capable of displaying in the display section 13 an image on the basis of image data stored in the mobile phone 2. FIG. 3A and FIG. 3B are flowcharts illustrating the processing steps to be performed by the CPUs in the control section 11 of the digital multi-function peripheral 1 and the control section 21 of the mobile phone 2. As described above, in the communication system, the information processing system and the image formation system according to Embodiment 1, both of the digital multi-function peripheral 1 and the mobile phone 2 are Bluetooth compatible devices.

The CPU of the digital multi-function peripheral 1 decides whether or not the mobile phone 2 has approached within a given range (S101). The digital multi-function peripheral 1 has the reader/writer 15, and the mobile phone 2 has the contact/noncontact IC card 26. The reader/writer 15 of the digital multi-function peripheral 1 sends an activation signal (electromagnetic wave) all the time. For example, when the user brings the mobile phone 2 very close to the reader/writer 15, the contact/noncontact IC card 26 of the mobile phone 2 receives the activation signal sent from the reader/writer 15. When the contact/noncontact IC card 26 receives the activation signal, it sends a response signal responding to the activation signal. When the reader/writer 15 receives the response signal sent from the contact/noncontact IC card 26, the CPU of the digital multi-function peripheral 1 decides that the mobile phone 2 has approached within the given range.

When the CPU of the digital multi-function peripheral 1 decides that the mobile phone 2 has not approached within the given range (S101: NO), it waits until the mobile phone 2 approaches within the given range. On the other hand, when the CPU of the digital multi-function peripheral 1 decides that the mobile phone 2 has approached within the given range (S101: YES), it retrieves a Bluetooth address held by the wireless communication section 16 (hereinafter referred to as the multi-function peripheral address) and sends it to the reader/writer 15. Then, the CPU of the digital multi-function peripheral 1 sends the multi-function peripheral address (identification data) through the reader/writer 15 (second communication means, sending means) to the contact/noncontact IC card 26 of the mobile phone 2 (S102).

Meanwhile, the CPU of the mobile phone 2 monitors the contact/noncontact IC card (third communication means, receiving means) 26 and decides whether or not the multi-function peripheral address has been received from the multi-function peripheral 1 (S201). When the CPU of the mobile phone 2 decides that the multi-function peripheral address has not been received (S201: NO), it waits until it receives the multi-function peripheral address. When the CPU of the mobile phone 2 decides that the multi-function peripheral address has been received (S201: YES), it stores the received multi-function peripheral address in the storage area in the contact/non-contract IC card 26.

Figure 4:
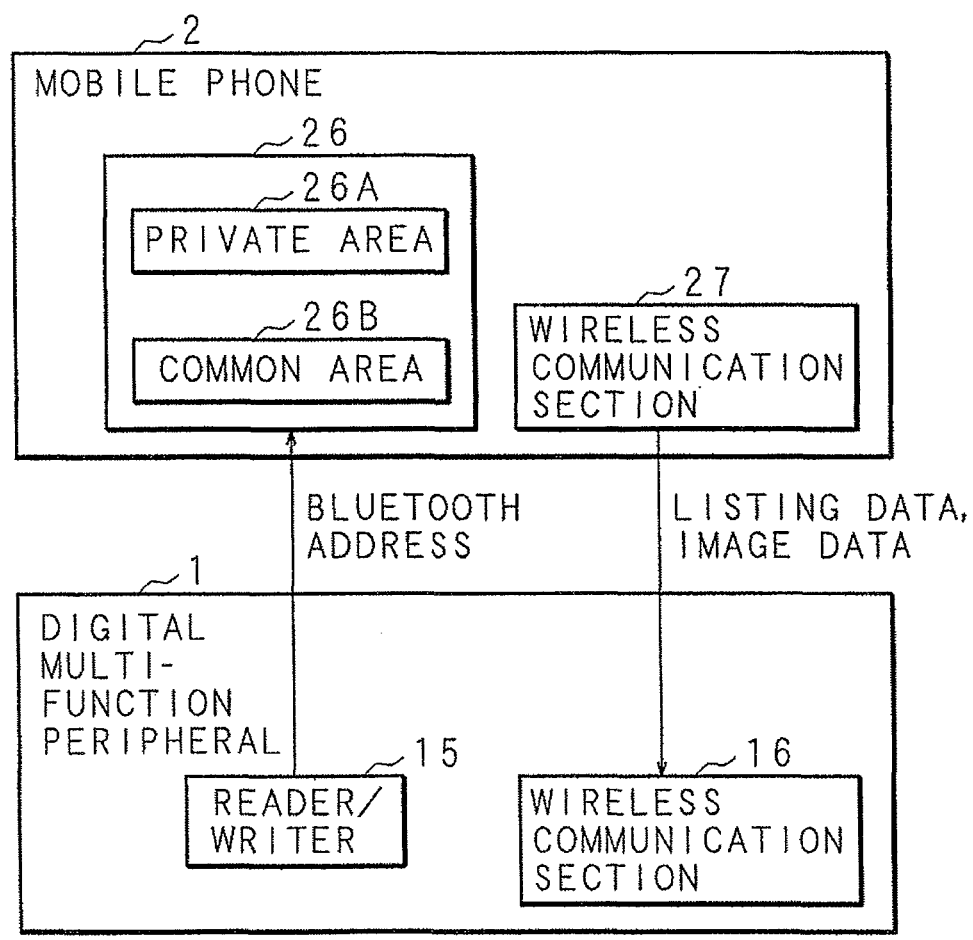
FIG. 4 is an explanatory view explaining the structure of the storage area in a contact/noncontact IC card.

FIG. 4 is an explanatory view explaining the structure of the storage area in the contact/noncontact IC card 26. The storage area in the contact/noncontact IC card 26 includes a common area 26B and a private area 26A (free area). The CPU of the mobile phone 2 writes the received multi-function peripheral address (identification data) in the private area (first storing means) 26A in the contact/noncontact IC card 26. The private area 26A is an area that a service provider may use freely. Highly free writing becomes possible by using the private area 26A. On the other hand, it is possible to write data in the common area 26B. In this case, however, since a remote issuing system for the contact/noncontact IC card 26 must be used, there is a problem that the degree of freedom in writing is low.

The CPU of the mobile phone 2 sends a pairing request and the Bluetooth address of the wireless communication section 27 (hereinafter referred to as the mobile phone address) to the digital multi-function peripheral 1 (S202). Here, the wireless communication section 27 of the mobile phone 2 sends the mobile phone address and data requesting for pairing to the wireless communication section 16 of the digital multi-function peripheral 1.

The CPU of the digital multi-function peripheral 1 monitors the wireless communication section 16 and decides whether or not a pairing request and a mobile phone address have been received from a mobile phone 2 (S103). When the CPU of the digital multi-function peripheral 1 decides that a pairing request and a mobile phone address have not been received (S103: NO), it waits until it receives a pairing request and a mobile phone address. When the CPU of the digital multi-function peripheral 1 decides that a pairing request and a mobile phone address have been received (S103: YES), it stores the received mobile phone address in the storage section (second storing means) 14. The CPU of the digital multi-function peripheral 1 displays a passkey input screen asking for a passkey in the display section 13 of the operation panel 12 (S104) and requests the user to input (enter) a passkey. The CPU of the digital multi-function peripheral 1 receives the passkey inputted by the user through the operation panel 12 (or the touch panel of the display section 13), and stores the received passkey temporarily in the storage section 14.

The CPU of the digital multi-function peripheral 1 compares the passkey inputted by the user with a passkey stored in advance in the storage section 14. If the passkeys match, a connection between the digital multi-function peripheral 1 and the mobile phone 2 is established, and they are set to be ready to communicate with each other. On the other hand, if the passkeys do not match, the CPU of the digital multi-function peripheral 1 displays this fact and a screen asking for the input of a passkey again in the display section 13.

When a connection is established with the mobile phone 2, the CPU (connection rejecting means) of the digital multi-function peripheral 1 starts invalidating connection establishment requests (pairing requests) from other devices (S105). In other words, when a connection is established with the mobile phone 2, even if the wireless communication section 16 receives data requesting for pairing from other devices, the CPU of the digital multi-function peripheral 1 invalidates the received data.

Thereafter, the CPU (stopping means) of the digital multi-function peripheral 1 cuts off a power source supplying power to the reader/writer 15 and stops the reader/writer 15 from sending the multi-function peripheral address (S106).

Thus, after the digital multi-function peripheral 1 is connected to one mobile phone 2, it invalidates the pairing requests from other devices, thereby preventing a third party from fraudulently accessing the mobile phone 2 through the digital multi-function peripheral 1 by ill-using the multiple pairing capability of communication using the Bluetooth technology. Hence, manipulation and stealing of data in the mobile phone 2 through the digital multi-function peripheral 1 are prevented.

Next, the CPU of the digital multi-function peripheral 1 requests listing data (content data) for displaying a list of file names of images, business documents etc. held in the mobile phone 2 (S107). More specifically, the CPU of the digital multi-function peripheral 1 sends data requesting for listing data to the mobile phone 2 through the wireless communication section 16.

When the wireless communication section 27 receives the data requesting for listing data from the digital multi-function peripheral 1, the CPU of the mobile phone 2 retrieves the listing data of the file names of images, documents etc. stored in the flash memory 24 and sends it to the digital multi-function peripheral 1 through the wireless communication section 27 (S203).

The CPU of the digital multi-function peripheral 1 obtains through the wireless communication section (obtaining means) 16 the listing data sent from the mobile phone 2 (S108) and stores it in the storage section 14.

The CPU (display means) of the digital multi-function peripheral 1 displays in the display section 13 the file name list screen for receiving from the user the selection of a file desired to be printed on the basis of the listing data stored in the storage section 14 (S109).

Figure 5:
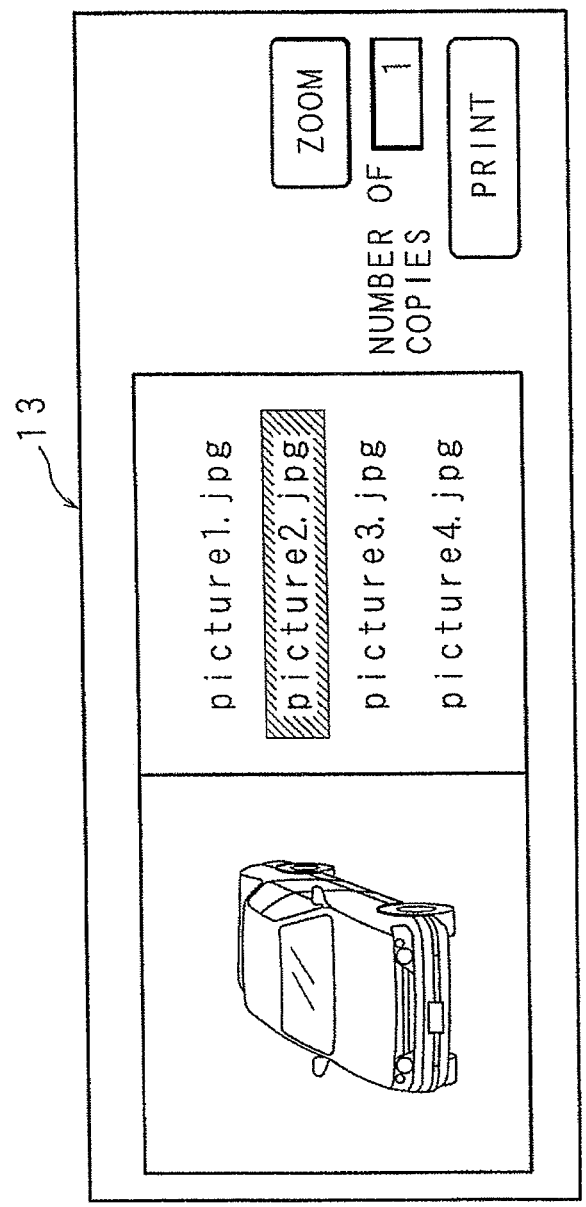
FIG. 5 is an exemplary view illustrating one example of a file name list screen displayed in a display section of the digital multi-function peripheral.

FIG. 5 is an exemplary view illustrating one example of the file name list screen displayed in the display section 13 of the digital multi-function peripheral 1. In the file name list screen, a plurality of file names on the basis of the listing data of the file names received from the mobile phone 2 are displayed, for example, in a scrollable way. Moreover, in the file name list screen, a thumbnail of a file selected by the user by operating the operation panel 12 (or the touch panel of the display section 13) is displayed. Further, in the file name list screen, soft keys such as "Number of Copies", "Zoom" and "Print" are displayed. The CPU of the digital multi-function peripheral 1 may receive print settings, such as the number of copies to be printed and the scale to be changed, from the user through the operation panel 12 (or the touch panel of the display section 13). The user selects a file desired to be printed, enters print settings through this screen, and instructs to start printing by operating the "Print" soft key. In this case, since the user selects a desired file on the large display section 13 of the digital multi-function peripheral 1 instead of operating a small key while looking at the small liquid crystal monitor of the mobile phone 2, better image viewing performance and key operation performance are obtained.

The CPU of the digital multi-function peripheral 1 monitors the operation panel 12 and the touch panel of the display section 13, and decides whether or not the selection of a file has been received from the user (S110). When the CPU of the digital multi-function peripheral 1 decides that it has not received the selection of a file (S110: NO), it waits until the selection of a file is received. On the other hand, when the CPU of the digital multi-function peripheral 1 decides that it has received the selection of a file (S110: YES), it decides whether or not is has received a print instruction from the user (S111). The decision here is made by the CPU by monitoring the operation panel 12 and the touch panel of the display section 13.

When the CPU of the digital multi-function peripheral 1 decides that it has not received a print instruction (S111: NO), it waits until a print instruction is received. When the CPU of the digital multi-function peripheral 1 decides that it has received a print instruction (S111: YES), it requests the mobile phone 2 for image data of a file selected (hereinafter referred to as the selected file) (S112). Here, the wireless communication section 16 makes the request by sending the mobile phone 2 data requesting for sending the image data of the selected file.

The CPU of the mobile phone 2 monitors the wireless communication section 27 and decides whether or not there is a request for the image data of the selected file from the digital multi-function peripheral 1 (S204). When the CPU of the mobile phone 2 decides that there is no request for the image data of the selected file (S204: NO), it waits until it receives a request for the image data. When the CPU of the mobile phone 2 decides that there is a request for the image data of the selected file (S204: YES), it retrieves from the flash memory 24 the image data of the selected file requested from the digital multi-function peripheral 1, and sends it to the digital multi-function peripheral 1 through the wireless communication section 27 (S205).

When the CPU of the digital multi-function peripheral 1 receives through the wireless communication section 16 the image data of the selected file from the mobile phone 2 (S113), it stores the received image data in the storage section 14.

Then, the CPU of the digital multi-function peripheral 1 sends the image data stored in the storage section 14 to the image output section 19, and prints an image on the basis of the image data by the image output section 19 (S114).

The CPU of the digital multi-function peripheral 1 sends data notifying the result of printing, such as printing has been completed normally, or a printing error has occurred, through the wireless communication section (notifying means) 16 to the mobile phone 2 (S115).

The CPU of the mobile phone 2 obtains data notifying the result of printing from the digital multi-function peripheral 1 through the wireless communication section 27 (S206) and stores it in the flash memory 24.

Next, the CPU of the mobile phone 2 sends through the output section 22 an output on the basis of the data notifying the result of printing stored in the flash memory 24 (S207). Here, for example, the output may be implemented by displaying text notifying the result of printing in the liquid crystal monitor of the mobile phone 2, or outputting through a speaker of the mobile phone 2 a voice notifying the result of printing, or a warning sound.

After the notification of the result of printing, the CPU of the digital multi-function peripheral 1 decides whether or not printing is to be finished (S116). Here, for example, the CPU of the digital multi-function peripheral 1 displays text asking "Do you want to finish printing?" and soft keys representing "YES" and "NO" in the display section 13 and monitors an operation of the display section 13 (touch panel) to make the decision.

When the CPU of the digital multi-function peripheral 1 decides not to finish printing (S116: NO), it returns to the process of step S109, displays the file name list screen again in the display section 13, and receives the selection of a file desired to be printed from the user. When the CPU of the digital multi-function peripheral 1 decides to finish printing (S116: YES), then it decides whether or not communication is to be finished (S117). Here, for example, the CPU of the digital multi-function peripheral 1 displays text asking "Do you want to finish communication?" and soft keys representing "YES" and "NO" in the display section 13 and monitors an operation of the display section 13 (touch panel) to make the decision.

When the CPU of the digital multi-function peripheral 1 decides not to finish communication (S117: NO), it returns to the process of step S116 again. On the other hand, when the CPU of the digital multi-function peripheral 1 decides to finish communication (S117: YES), it sends data stating that communication is finished to the mobile phone 2 through the wireless communication section 16 to notify that printing is finished (S118).

The CPU (second deleting means) of the digital multi-function peripheral 1 deletes the mobile phone address received in step S103 and the passkey received in step S104 from the storage section 14 (S119). It is thus possible to prevent a third party with malicious intent from ill-using the communication history and stealing the mobile phone address. Note that the decision as to whether or not to finish printing, or the decision as to whether or not to finish communication between the digital multi-function peripheral 1 and the mobile phone 2, is not necessarily made on the basis of an instruction from the user, and, for example, a decision to finish printing or communication may be made when the display section 13 (touch panel) is not operated for a given period of time.

The CPU of the digital multi-function peripheral 1 cancels the setting of invalidating connection establishment requests from other devices, which was started in step S105 (S120), and finishes the process.

For example, after sending an output indicating normal completion in step S207, the CPU of the mobile phone 2 monitors the wireless communication section 27 and decides whether or not a notification of completion of communication has been received in a given period of time (S208). When the CPU of the mobile phone 2 decides that a notification of completion of communication has not been received even after the given period of time (S208: NO), the CPU of the mobile phone 2 returns to the process of step S204 and decides whether or not there is a request for image data from the digital multi-function peripheral 1. On the other hand, when the CPU (first deleting means) of the mobile phone 2 decides that a notification of completion of communication has been received (S208: YES), it deletes the multi-function peripheral address received in step S201 from the storage area in the contact/noncontact IC card 26 (S209) and finishes the communication.

As described above, in the communication system, the information processing system and the image formation system of Embodiment 1, the user of the mobile phone 2 receives the multi-function peripheral address from the digital multi-function peripheral 1, and sends data from the mobile phone 2 to the digital multi-function peripheral 1 by using the multi-function peripheral address. It is thus possible to prevent confidential information (such as, for example, the address and passkey) in the mobile phone 2 from leaking against the user's intention. Moreover, after finishing the communication, the received Bluetooth address (and the received passkey) of the partner are deleted from each of the digital multi-function peripheral 1 and the mobile phone 2. Hence, it is possible to prevent leakage of the communication history (the Bluetooth address and passkey of the partner), and it is also possible to prevent the Bluetooth address of the connected party obtained whenever pairing is made from wastefully occupying the resource of each of the digital multi-function peripheral 1 and the mobile phone 2, thereby enabling more effective use of the resources of the digital multi-function peripheral 1 and the mobile phone 2.

Embodiment 1 described above has explained the configuration in which the user manually inputs a passkey so as to certainly input the passkey. However, if simplicity has priority, the passkey may be sent/received through the reader/writer 15 of the digital multi-function peripheral 1 and the contact/noncontact IC card 26 of the mobile phone 2.

For a device (such as a mouse and a head set) which is not capable of inputting a passkey, the passkey may be set to a fixed value, or a structure that eliminates the need of inputting the passkey may be configured. For instance, in such a device that is not capable of inputting a passkey, a simple combination of numbers such as, for example "0000" may be set as the default passkey.

(Embodiment 2)

The following will explain a communication process and an image formation process which are performed by a digital multi-function peripheral 1 and a mobile phone 2 in a communication system, an information processing system, and an image formation system according to Embodiment 2. Parts similar to those in Embodiment 1 described above will be designated with the same reference codes, and detailed explanations thereof will be omitted.

Figure 6:
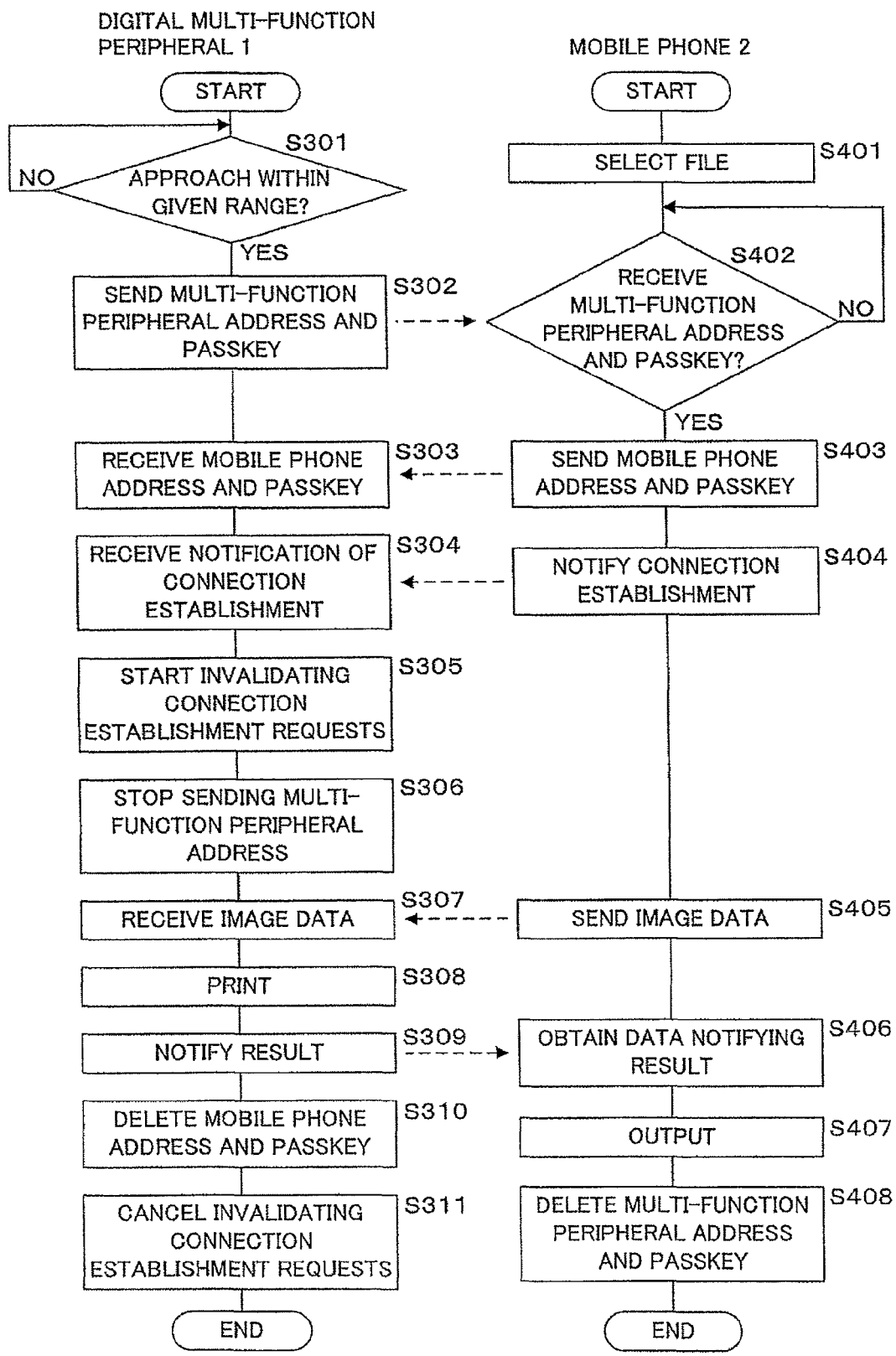
FIG. 6 is a flowchart illustrating the processing steps to be performed by CPUs in a control section of a digital multi-function peripheral and a control section of a mobile phone of Embodiment 2.

The following will explain an example in which an image on the basis of image data stored in a user's mobile phone 2 is printed by the digital multi-function peripheral 1. In the communication system, the information processing system and the image formation system of Embodiment 2, sending and receiving of a passkey is performed through the reader/writer 15 of the digital multi-function peripheral 1 and the contact/noncontact IC card 26 of the mobile phone 2. FIG. 6 is a flowchart illustrating the processing steps to be performed by the CPUs in the control section 11 of the digital multi-function peripheral 1 and the control section 21 of the mobile phone 2.

Figure 7:
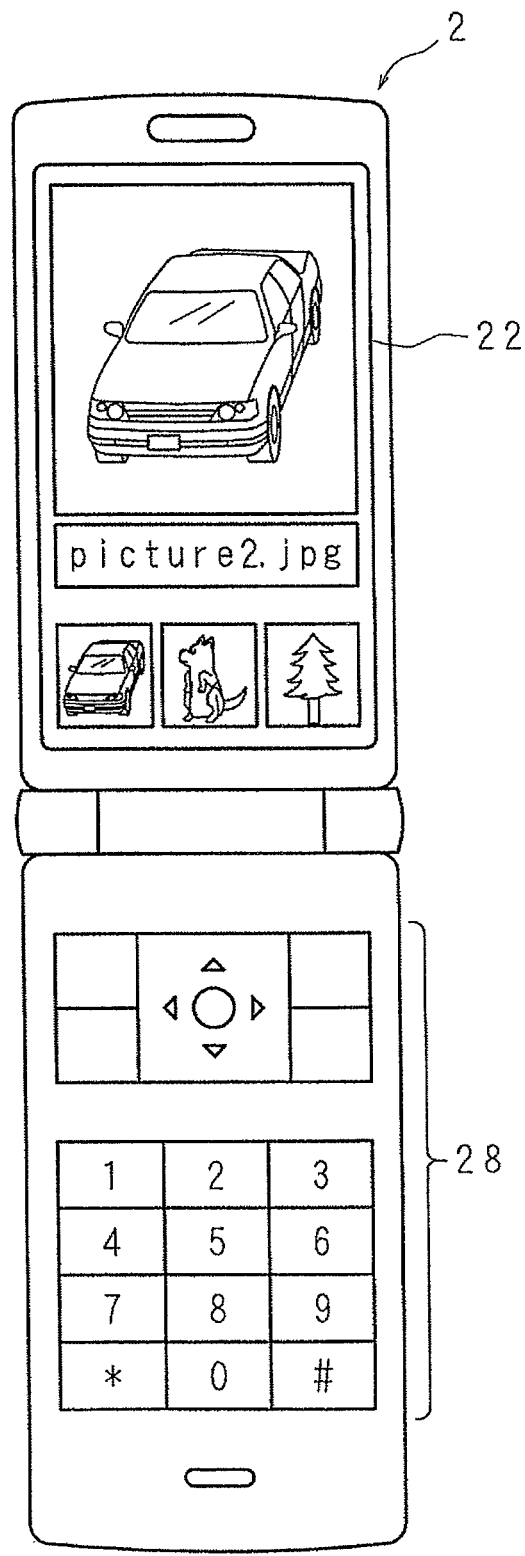
FIG. 7 is an explanatory view explaining an operation performed in the mobile phone to select a file to be printed.

The user of the mobile phone 2 operates the mobile phone 2 to select a file to be printed (S401). FIG. 7 is an explanatory view explaining an operation performed in the mobile phone 2 to select a file to be printed. The liquid crystal monitor (output section 22) of the mobile phone 2 displays thumbnails of image data stored in the flash memory 24, and receives the selection of any of the thumbnails made by moving the cursor by operating a key (such as a press button on the operation panel 28). When a thumbnail is selected, the output section 22 displays the file name (of the selected file) corresponding to the selected thumbnail and an image larger than the thumbnail as illustrated in FIG. 7. In a state in which the file to be printed is selected as illustrated in FIG. 7, the user brings the mobile phone 2 very close to the reader/writer 15 of the digital multi-function peripheral 1.

Meanwhile, the CPU of the digital multi-function peripheral 1 decides whether or not the mobile phone 2 has approached within a given range (S301). More specifically, when the reader/writer 15 has received a response signal sent by the contact/noncontact IC card 26 of the mobile phone 2 in respond to an activation signal sent by the reader/writer 15, the CPU of the digital multi-function peripheral 1 decides that the mobile phone 2 has approached within the given range. When the CPU of the digital multi-function peripheral 1 decides that the mobile phone 2 has not approached within the given range (S301: NO), it waits until the mobile phone 2 approaches with the given range. When the CPU of the digital multi-function peripheral 1 decides that the mobile phone 2 has approached within the given range (S301: YES), it retrieves the Bluetooth address (the multi-function peripheral address) and the passkey held by the wireless communication section 16, and sends them to the contact/noncontact IC card 26 of the mobile phone 2 (S302). More specifically, the CPU of the digital multi-function peripheral 1 sends the retrieved multi-function peripheral address and passkey to the reader/writer 15, and then the reader/writer 15 sends them to the contact/noncontact IC card 26 of the mobile phone 2. The passkey may be stored in the wireless communication section 16 together with the multi-function peripheral address, or may be stored in the storage section 14.

The CPU of the mobile phone 2 monitors the contact/noncontact IC card 26 and decides whether or not the multi-function peripheral address and the passkey have been received (S402). When the CPU of the mobile phone 2 decides that the multi-function peripheral address and the passkey have not been received (S402: NO), it waits until it receives the multi-function peripheral address and the passkey. When the CPU of the mobile phone 2 decides that the multi-function peripheral address and the passkey have been received (S402: YES), it stores the received multi-function peripheral address and passkey in the storage area in the contact/non-contract IC card 26.

Next, the CPU of the mobile phone 2 tries to establish a connection with the digital multi-function peripheral 1 by sending the mobile phone address and passkey stored in the wireless communication section 27 to the digital multi-function peripheral 1 through the wireless communication section 27 (S403). The passkey may be stored in the wireless communication section 27 together with the mobile phone address, or may be stored in the flash memory 24.

When the CPU of the digital multi-function peripheral 1 receives the mobile phone address and passkey from the mobile phone 2 through the wireless communication section 16 (S303), it stores the mobile phone address and passkey in the storage section 14. Pairing is completed by receiving the mobile phone address and passkey, and the digital multi-function peripheral 1 and the mobile phone 2 are connected to each other and set to be ready to communicate with each other.

Next, the CPU of the mobile phone 2 notifies the establishment of connection by sending data indicating that a connection has been established to the digital multi-function peripheral 1 through the wireless communication section 27 (S404).

The CPU of the digital multi-function peripheral 1 receives the notification of the establishment of connection indicating that a connection has been established from the mobile phone 2 through the wireless communication section 16 (S304). Then, the CPU of the digital multi-function peripheral 1 starts to invalidate connection establishment requests (pairing requests) from other devices (S305). In other words, when a connection is established, even if the wireless communication section 16 receives data requesting for pairing, the CPU of the digital multi-function peripheral 1 invalidates the data. Moreover, the CPU of the multi-function peripheral 1 cuts off the power source supplying power to the reader/writer 15 and stops the reader/writer 15 from sending the multi-function peripheral address (S306).

After notifying the establishment of connection, the CPU of the mobile phone 2 retrieves the image data of the file selected in step S401 from the flash memory 24 and sends it to the digital multi-function peripheral 1 through the wireless communication section 27 (S405).

The CPU of the digital multi-function peripheral 1 receives the image data from the mobile phone 2 through the wireless communication section 16 (S307), and stores the received image data in the storage section 14. Next, the CPU of the digital multi-function peripheral 1 sends the image data stored in the storage section 14 to the image output section 19 and prints an image on the basis of the image data by the image output section 19 (S308).

The CPU of the digital multi-function peripheral 1 sends data notifying the result of printing, such as normal completion of printing, or occurrence of an error during printing, to the mobile phone 2 through the wireless communication section 16 (S309).

The CPU of the digital multi-function peripheral 1 deletes the mobile phone address and passkey received in step S303 from the storage section 14 (S310). Thus, stealing of the mobile phone address by a third party with malicious intent is prevented.

Thereafter, the CPU of the digital multi-function peripheral 1 cancels the setting of invalidating connection establishment requests (pairing requests) from other devices, which was started in step S305, (S311) and finishes the process.

Meanwhile, the CPU of the mobile phone 2 obtains the data notifying the result of printing from the digital multi-function peripheral 1 through the wireless communication section 27 (S406), and stores it in the flash memory 24.

The CPU of the mobile phone 2 sends though the output section 22 an output on the basis of the data notifying the result of printing stored in the flash memory 24 (S407).

Moreover, the CPU of the mobile phone 2 deletes the multi-function peripheral address and passkey received in step S402 from the storage area in the contact/noncontact IC card 26 (S408), and completes the process. Thus, stealing of the multi-function peripheral address by a third party with malicious intent is prevented.

As described above, in the communication system, the information processing system and the image formation system according to Embodiment 2, by just bringing the mobile phone 2 which selected a file to be printed beforehand close to the digital multi-function peripheral 1, the digital multi-function peripheral 1 is caused to print the file, and thus the printing operation is extremely facilitated.

The above description has explained an image forming apparatus, a mobile information terminal device, a communication system, an information processing system, and an image formation system according to the present invention by illustrating an example including the digital multi-function peripheral 1 (image forming apparatus) and the mobile phone 2. However, the present invention is not limited to this. For example, the mobile phone 2 may be a digital camera, a mobile computer, or a mobile terminal device called a PDA, with a communication function. Moreover, the present invention may have not only a structure for sending data from the mobile phone 2 to the digital multi-function peripheral 1, but also a structure for sending document image data read by a scanner of the digital multi-function peripheral 1 to the mobile phone 2. Further, the present invention may have a structure for sending facsimile image data, electronic data etc. stored in the storage device in the digital multi-function peripheral 1 to the mobile phone 2. In addition, it is possible to produce the same effects as those of the present invention between devices, each of which having two or more communication means for communicating with each other like the reader/writer 15 and the wireless communication section 16 in the digital multi-function peripheral 1 (the image forming apparatus) and the contact/noncontact IC card 26 and the wireless communication section 27 in the mobile phone 2.

Although Embodiment 2 explains an example in which when the user brings the mobile phone 2 very close to the reader/writer 15 of the digital multi-function peripheral 1, the multi-function peripheral address is sent from the reader/writer 15 to the contact/noncontact IC card 26 of the mobile phone 2, the present invention is not limited to this. For instance, the present invention may be configured to send the mobile phone address from the contact/noncontact IC card 26 of the mobile phone 2 to the reader/writer 15 of the digital multi-function peripheral 1 when the user brings the mobile phone 2 very close to the reader/writer 15 of the digital multi-function peripheral 1.

In Embodiments 1 and 2 described above, although deletion of the address and passkey is performed in only one way, a mobile phone 2 may be provided with a control section for sending a deletion instruction. In this configuration, even if an image forming apparatus (a digital multi-function peripheral 1) having no deletion control section is used, the address stored in the digital multi-function peripheral 1 is certainly deleted by an address deletion instruction from the mobile phone 2, thereby further enhancing security. Moreover, the present invention may be configured to let the user to decide whether to delete or keep the addresses stored in the digital multi-function peripheral 1 and the mobile phone 2, and receive an instruction according to the result of decision. For example, in the case when the user communicates with the digital multi-function peripheral 1 many times at short intervals, if data about the addresses and passkey are left in the digital multi-function peripheral 1 and the mobile phone 2, there is a merit that the digital multi-function peripheral 1 and the mobile phone 2 are enabled to communicate with each other without the process of bringing the mobile phone 2 very close to the digital multi-function peripheral 1.

Although Embodiments 1 and 2 describe an example in which the digital multi-function peripheral 1 (the image forming apparatus) receives image data from the mobile phone 2 and prints an image (forms an image) on the basis of the image data, the present invention is not limited to this. Needless to say, the present invention produces similar effects even when performing so-called data processing (or information processing) such as, for example, receiving text data from a mobile computer or a mobile terminal device called a PDA and editing the text data, or receiving image data and scaling or rotating the image data.

(Embodiment 3)

The following will explain a communication process and an image formation process which are performed by a digital multi-function peripheral 1 and a mobile phone 2 in an information processing system and an image formation system according to Embodiment 3. Parts similar to those in Embodiment 1 described above will be designated with the same reference codes, and detailed explanations thereof will be omitted.

In Embodiment 3, when the CPU of the digital multi-function peripheral 1 sends the unique Bluetooth address (identification data, unique address) of the wireless communication section 16 through the reader/writer 15 to an external device, it stores this fact in the storage section 14.

In Embodiment 3, the operation panel 12 of the digital multi-function peripheral 1 has the "Connection Establishment Restriction" key for receiving from a user the selection of a connection establishment request to be accepted by the digital multi-function peripheral 1. When the user operates the "Connection Establishment Restriction" key on the operation panel 12, the display section 13 displays a connection selection receiving screen for receiving from the user the selection of a connection establishment request to be accepted by the digital multi-function peripheral 1. Moreover, the operation panel 12 of Embodiment 3 displays in the display section 13 an image (screen) on the basis of data received from the mobile phone 2 with which the connection has been established.

Next, an outline of the functions of the digital multi-function peripheral 1 of Embodiment 3 will be explained. The following will explain an example in which the digital multi-function peripheral 1 obtains image data from the mobile phone 2 and prints an image on the basis of the obtained image data. In Embodiment 3, the contact/noncontact IC card 26 of the mobile phone 2 communicates with the reader/writer 15 of the digital multi-function peripheral 1 by a non-contact communication system (RFID system), and the wireless communication section 27 of the mobile phone 2 performs wireless communication with the wireless communication section 16 of the digital multi-function peripheral 1 by a Bluetooth communication system. The mobile phone 2 retrieves listing data of the file names of images, documents etc. stored in the flash memory 24, according to a request from the digital multi-function peripheral 1, and sends it to the digital multi-function peripheral 1.

Figure 8:
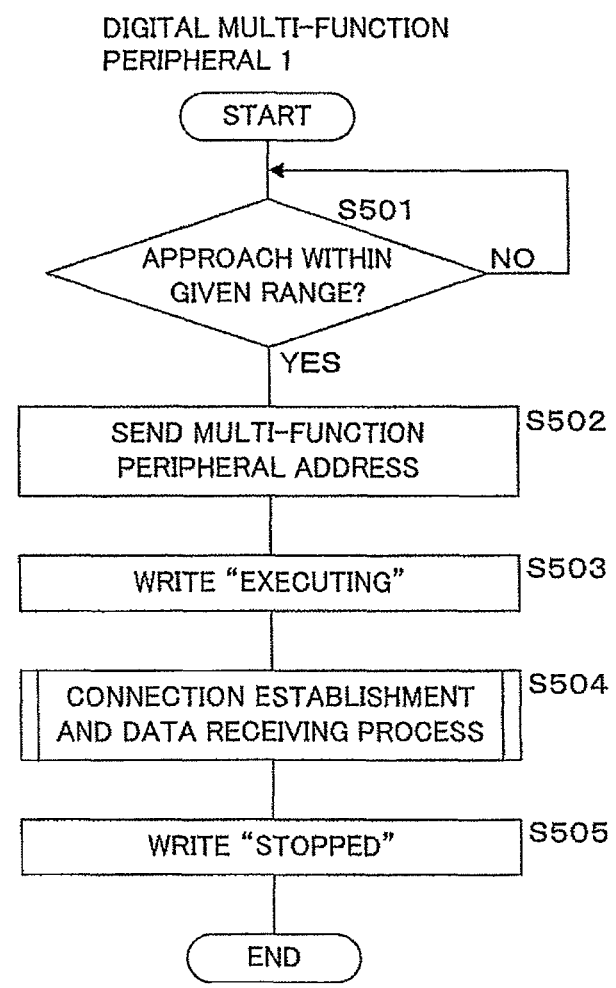
FIG. 8 is a flowchart illustrating the processing steps to be performed by a CPU in a control section of a digital multi-function peripheral of Embodiment 3.

When the mobile phone 2 has approached within a range of a given distance, the digital multi-function peripheral 1 sends the Bluetooth address of the wireless communication section 16 (the multi-function peripheral address) from the reader/writer 15 to the contact/noncontact IC card 26 of the mobile phone 2, and stores data indicating this fact in the storage section 14. FIG. 8 is a flowchart illustrating the processing steps to be performed by the CPU in the control section 11 of the digital multi-function peripheral 1 of Embodiment 3.

The CPU of the digital multi-function peripheral 1 decides whether or not the mobile phone 2 has approached within a given range (S501). More specifically, when the reader/writer 15 receives a response signal sent from the contact/noncontact IC card 26 of the mobile phone 2 in respond to an activation signal sent by the reader/writer 15, the CPU of the digital multi-function peripheral 1 decides that the mobile phone 2 has approached within the given range.

When the CPU of the digital multi-function peripheral 1 decides that the mobile phone 2 has not approached within the given range (S501: NO), it waits until the mobile phone 2 approaches within the given range. When the CPU of the digital multi-function peripheral 1 decides that the mobile phone 2 has approached within the given range (S501: YES), it retrieves the multi-function peripheral address held by the wireless communication section 16 and sends it to the reader/writer 15. Then, the CPU of the digital multi-function peripheral 1 sends the multi-function peripheral address through the reader/writer 15 to the contact/noncontact IC card 26 of the mobile phone 2 (S502). The multi-function peripheral address sent to the contact/noncontact IC card 26 of the mobile phone 2 is stored in the storage section in the contact/noncontact IC card 26. Note that the mobile phone 2 writes the received multi-function peripheral address in the private area 26A (see FIG. 4) in the contact/noncontact IC card 26.

Next, the CPU of the digital multi-function peripheral 1 stores in the storage section 14 data indicating that the multi-function peripheral address was sent by the reader/writer 15. For example, a job status management area for storing the status of sending the multi-function peripheral address by the reader/writer 15 is provided in a part of the storage area in the storage section 14. The CPU of the digital multi-function peripheral 1 writes "Stopped" in the job status management area in the storage section 14 before the multi-function peripheral address is sent by the reader/writer 15, and writes (rewrites) "Executing" in the job status management area in the storage section 14 after the reader/writer 15 sent the multi-function peripheral address (S503).

Thereafter, the CPU of the digital multi-function peripheral 1 performs a later-described connection establishment and data receiving process (S504).

After completing the connection establishment and data receiving process, the CPU of the digital multi-function peripheral 1 writes "Stopped" again in the storage section 14 (S505), and finishes the process.

Figure 9A:
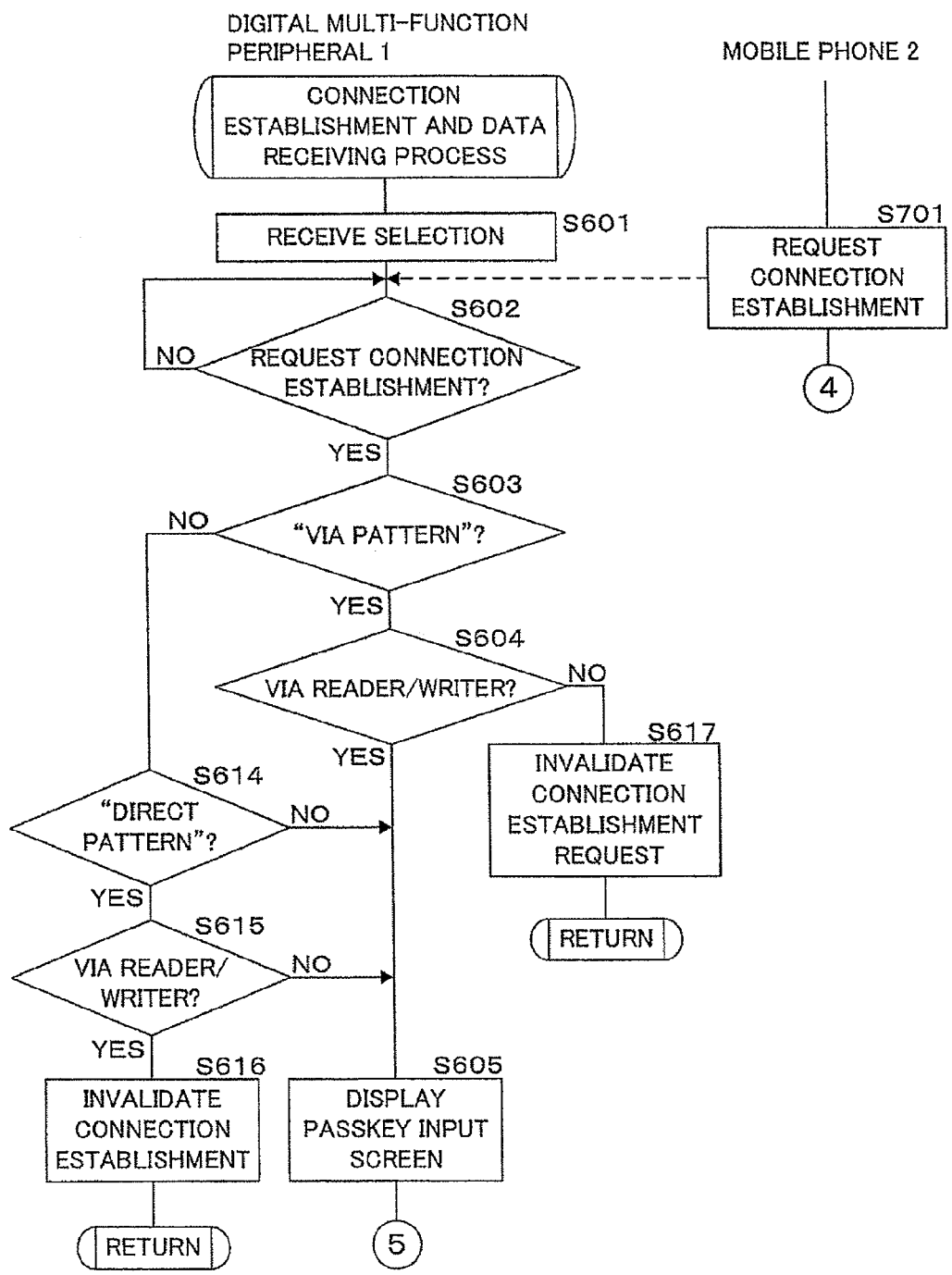
FIG. 9A and FIG. 9B are flowcharts illustrating the processing steps to be performed by the CPUs in the control section of the digital multi-function peripheral and the control section of the mobile phone of Embodiment 3.
Figure 9B:
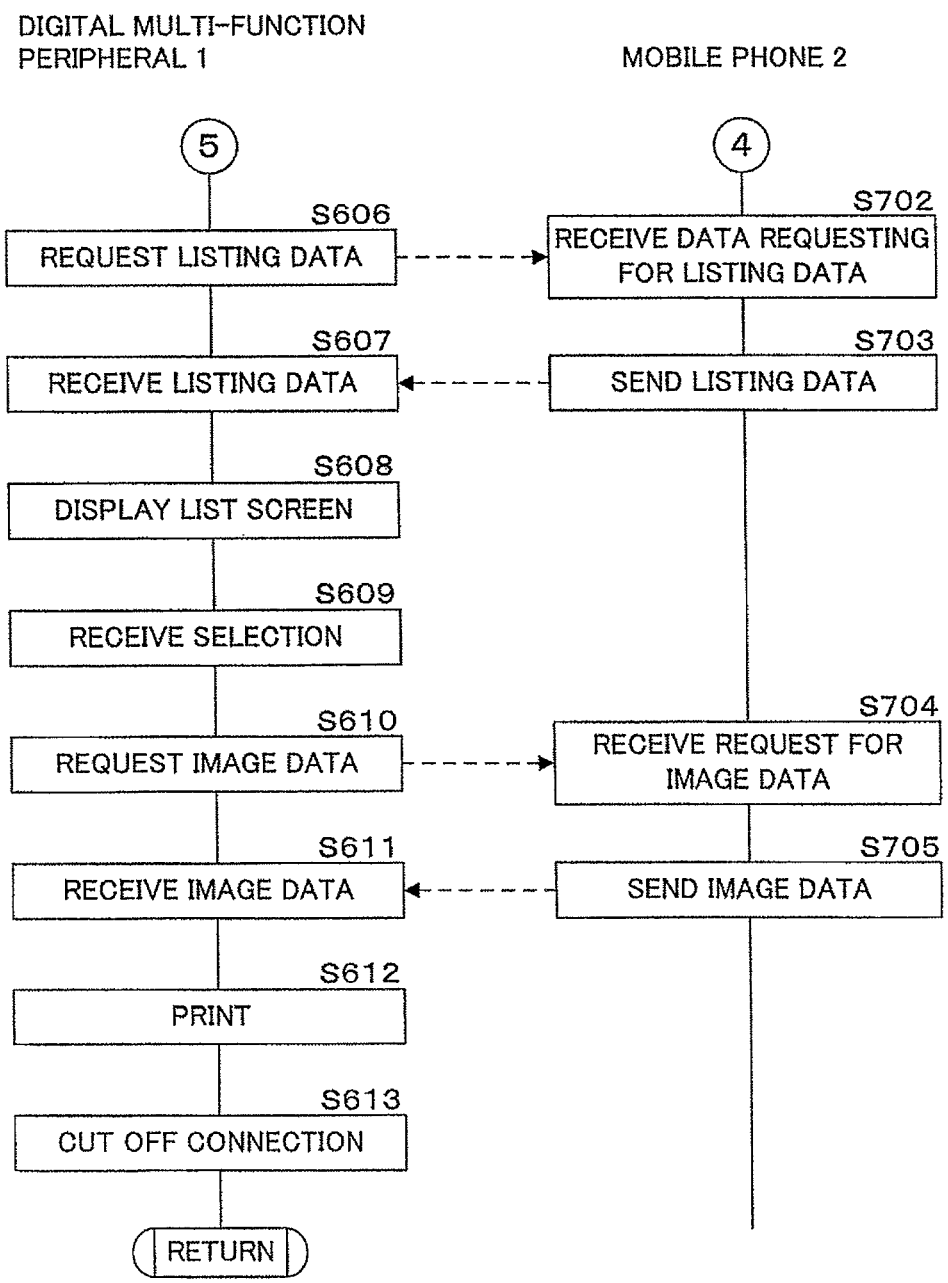

Next, the connection establishment and data receiving process will be explained in detail. FIG. 9A and FIG. 9B are flowcharts illustrating the processing steps to be performed by the CPUs in the control section 11 of the digital multi-function peripheral 1 and the control section 21 of the mobile phone 3 of Embodiment 3.

The CPU of the digital multi-function peripheral 1 monitors the "Connection Establishment Restriction" key on the operation panel 12, and displays the connection selection receiving screen in the display section 13 when the user operates the "Connection Establishment Restriction" key. The CPU (selection receiving means) of the digital multi-function peripheral 1 receives through the connection selection receiving screen the selection of a connection establishment request to be accepted by the digital multi-function peripheral 1 (S601).

This process will be explained in detail below. As a method for an external device to make a connection establishment request to the digital multi-function peripheral 1 (wireless communication section 16), two patterns are considered. In the first pattern, a device which received the multi-function peripheral address sent from the reader/writer 15 makes a connection establishment request to the wireless communication section 16 of the digital multi-function peripheral 1 by using the received multi-function peripheral address. In short, this is a connection establishment request (first connection establishment request) from the recipient of the multi-function peripheral address. In the second pattern, a device which did not receive the multi-function peripheral address makes a connection establishment request to the wireless communication section 16 of the digital multi-function peripheral 1. Namely, this is a connection establishment request (second connection establishment request) from other than the recipient of the multi-function peripheral address. As the second pattern, there may be a case where other Bluetooth compatible device within a given short distance (for example 100 m) from the digital multi-function peripheral (the wireless connection device 16) searches for and obtains the multi-function peripheral address of the digital multi-function peripheral 1 (the wireless communication section 16) and makes a connection establishment request by using the obtained multi-function peripheral address, or a case where other Bluetooth compatible device makes a connection establishment request by using the communication history if it communicated with the digital multi-function peripheral 1 (the wireless communication section 16) in the past. The digital multi-function peripheral 1 of Embodiment 3 may establish a pattern of connection selected from these two patterns according to a need. The above-described first pattern is called the "via pattern" and the second pattern is called the "direct pattern" below.

FIG. 10 is an exemplary view illustrating one example of the connection selection receiving screen. Selections (soft keys) representing "1. Allow only requests via the reader/writer", "2. Allow only direct requests", and "3. Allow both" are displayed in the connection selection receiving screen, and the user may select one of them by suitably operating the operation panel 12 (or the touch panel). The CPU of the digital multi-function peripheral 1 stores the selection received through the connection selection receiving screen in the storage section 14. For example, when "1. Allow only requests via the reader/writer" is selected, only connection establishment requests corresponding to "via pattern" are accepted. When "2. Allow only direct requests" is selected, only connection establishment requests corresponding to "direct pattern" are accepted. When "3. Allow both" is selected, connection establishment requests corresponding to "via pattern" and "direct pattern" are accepted.

When the CPU of the mobile phone 2 decides that the multi-function peripheral address has been received from the digital multi-function peripheral 1 (see S502), it stores the received multi-function peripheral address in the storage area in the contact/noncontact IC card 26. The CPU of the mobile phone 2 which received the multi-function peripheral address makes a connection establishment request to the digital multi-function peripheral 1 (S701). More specifically, the CPU of the mobile phone 2 sends the Bluetooth address of the wireless communication section 27 (the mobile phone address) and data requesting for pairing to the wireless communication section 16 of the digital multi-function peripheral 1 through the wireless communication section 27.

The CPU of the digital multi-function peripheral 1 monitors the wireless communication section 16 and decides whether or not there is a connection establishment request (or a pairing request) from the mobile phone 2 (S602). When the CPU of the digital multi-function peripheral 1 decides that there is not a connection establishment request (S602: NO), it waits until a connection establishment request is made by the mobile phone 2. When the CPU of the digital multi-function peripheral 1 decides that it has received a connection establishment request (S602: YES), it stores the mobile phone address received from the mobile phone 2 in the storage section 14.

Next, the CPU of the digital multi-function peripheral 1 decides, on the basis of the data stored in the storage section 14, whether or not the selection received in step S601 is "via pattern" (S603). When the CPU of the digital multi-function peripheral 1 decides that the selection is "via pattern" (S603: YES), it decides whether or not the connection establishment request received in step S602 was the connection of "via pattern" (via the reader/writer 15) (S604). Here, by referring to the data stored in the job status management area in the storage section 14, the CPU of the digital multi-function peripheral 1 decides whether or not the connection establishment request received in step S602 is a connection establishment request (a first connection establishment request) from the device (mobile phone 2) to which the reader/writer 15 sent the multi-function peripheral address.

More specifically, if "Executing" is written in the job status management area in the storage section 14, the multi-function peripheral address was already sent by the reader/writer 15, and therefore the CPU of the digital multi-function peripheral 1 decides that the received connection establishment request is a request for connection establishment of "via pattern" from the recipient device (mobile phone 2) to which the multi-function peripheral address was sent. If "Stopped" is written in the job status management area in the storage section 14, the reader/writer 15 has not sent the multi-function peripheral address, and therefore the CPU of the digital multi-function peripheral 1 decides that the received connection establishment request is a connection establishment request of "direct pattern" from a device which is not the recipient of the multi-function peripheral address.

When the CPU of the digital multi-function peripheral 1 decides that the connection establishment request received in step S602 was the connection of "via pattern" (via the reader/writer 15) (S604: YES), it displays the passkey input screen asking for the input of passkey in the display section 13 of the operation panel 12 (S605), and asks the user to input the passkey to establish a connection according to the received connection establishment request. The CPU of the digital multi-function peripheral 1 receives the input of the passkey from the user through the operation panel 12 (or the touch panel of the display section 13) and stores the received passkey temporarily in the storage section 14.

When the CPU of the digital multi-function peripheral 1 decides that the connection establishment request received in step S602 was not the connection of "via pattern" (via the reader/writer 15) (S604: NO), it decides that a connection establishment request of "direct pattern" was made, and invalidates the received connection establishment request (S617) and finishes the process.

In step S603, when the CPU of the digital multi-function peripheral 1 decides that the received selection is not "via pattern" (S603: NO), then it decides whether or not the received selection is "direct pattern" (S614).

When the CPU of the digital multifunction peripheral 1 decides that the received selection is not "direct pattern" (S614: NO), then it decides that "3. Allow Both" was selected, and moves the process to step S605.

When the CPU of the digital multi-function peripheral 1 decides that the received selection is "direct pattern" (S614: YES), it decides whether or not the connection establishment request received in step S602 was the connection of "via pattern" (via the reader/writer 15) (S615).

When the CPU of the digital multi-function peripheral 1 decides that the connection establishment request received in step S602 was not the connection of "via pattern" (via the reader/writer 15) (S615: NO), it displays the passkey input screen asking for the input of passkey in the display section 13 of the operation panel 12 (S605) and requests the user to input the passkey in order to establish a connection in respond to the received connection establishment request.

On the other hand, when the CPU of the digital multi-function peripheral 1 decides that the connection establishment request received in step S602 was the connection of "via pattern" (via the reader/writer 15) (S615: YES), it decides that it received a connection establishment request of "via pattern", and invalidates the received connection establishment request (S616) and finishes the process.

The CPU of the digital multi-function peripheral 1 compares the passkey received through the passkey input screen displayed in step S605 with the passkey stored in advance in the storage section 14. If the passkeys match, the CPU of the digital multi-function peripheral 1 establishes a connection with the mobile phone 2 (or completes pairing). Hence, the digital multi-function peripheral 1 and the mobile phone 2 are set to be ready to communicate with each other. On the other hand, when the CPU of the digital multi-function peripheral 1 decides that the passkeys do not match, it displays this fact and the screen asking for the input of passkey again in the display section 13.

Next, the CPU of the digital multi-function peripheral 1 requests the listing data of file names by sending data requesting for the listing data of the file names of images, documents etc. held by the mobile phone 2 with which the connection has been established to the wireless communication section 27 of the mobile phone 2 through the wireless communication section 16 (S606).

When the CPU of the mobile phone 2 receives the data requesting for the listing data from the digital multi-function peripheral 1 (S702), it retrieves the requested listing data from the flash memory 24 and sends it to the digital multi-function peripheral 1 through the wireless communication section 27 (S703).

The CPU of the digital multi-function peripheral 1 receives through the wireless communication section 16 the listing data sent from the mobile phone 2 (S607), and stores it in the storage section 14.

The CPU of the digital multi-function peripheral 1 displays, on the basis of the listing data stored in the storage section 14, the file name list screen for receiving the selection of a desired file to be printed from the user as illustrated in FIG. 5 in the display section 13 (S608).

The CPU of the digital multi-function peripheral 1 receives the selection of a file from the user through the operation panel 12 and the touch panel of the display section 13 (S609), and sends data requesting for image data of the file selected (selected file) to the mobile phone 2 through the wireless communication section 16 (S610).

When the CPU of the mobile phone 2 receives the request for the image data of the selected file from the digital multi-function peripheral 1 (S704), it retrieves the image data of the selected file from the flash memory 24 and sends it to the digital multi-function peripheral 1 through the wireless communication section 27 (S705).

When the CPU of the digital multi-function peripheral 1 receives the image data of the selected file from the mobile phone 2 through the wireless communication section 16 (S611), it stores the received image data in the storage section 14.

Next, the CPU of the digital multi-function peripheral 1 sends the image data stored in the storage section 14 to the image output section 19 and prints an image on the basis of the image data received from the mobile phone 2 by the image output section 19 (S612).

After printing is executed completely, the CPU of the digital multi-function peripheral 1 cuts off the connection to the mobile phone 2 (S613) and finishes the communication. At this time, the CPU of the digital multi-function peripheral 1 may delete the mobile phone address received in step S602 and the passkey received in step S605 from the storage section 14.

Although Embodiment 3 explains a configuration in which the user manually inputs the passkey in order to certainly input the passkey, the passkey may be sent and received through the reader/writer 15 of the digital multi-function peripheral 1 and the contact/noncontact IC card 26 of the mobile phone 2 if simplicity has priority.

For a device which is not capable of inputting a passkey (such as a mouse and a headset), the passkey may be set to a fixed value, or the device may be configured to eliminate the necessity of inputting the passkey. For example, for such a device which is not capable of inputting a passkey, a simple combination of numbers such as, for example, "0000" may be set as the default passkey.

The digital multi-function peripheral 1 may be configured to stop sending the multi-function peripheral address from the reader/writer 15, or stop supplying power to the reader/writer 15, when the "direct pattern" is set in the digital multi-function peripheral 1. In such a configuration, since the reader/writer 15 of the digital multi-function peripheral 1 is disabled to send the multi-function peripheral address, communication via the reader/writer 15 is completely blocked.

The present invention may also be configured so that if the mobile phone 2 is brought very close to the reader/writer 15 of the digital multi-function peripheral 1 when "direct pattern" is set, a message stating that only Bluetooth connection establishment is currently available, or a message stating that only Bluetooth connection establishment is to be requested, is displayed in the display sections 22 and 13 of the mobile phone 2 and the digital multi-function peripheral 1, respectively. With this display, the user notices his/her mistake and may easily understand the way to deal with the mistake. On other hand, if a request for connection establishment by "direct pattern" is made by an external device when the "via pattern" is set, a message stating that only connection establishment by "via pattern" is currently available, or a message stating that connection establishment by "via pattern" is to be requested, may be displayed in the display sections 22 and 13 of the mobile phone 2 and the digital multi-function peripheral 1, respectively.

In Embodiment 3, although a decision as to whether or not a connection establishment request received by the digital multi-function peripheral 1 (the wireless communication section 16) is "via pattern" or "direct pattern" is made on the basis of whether or not "Executing" is stored in the job status management area in the storage section 14 of the digital multi-function peripheral 1, the present invention is not limited to this. For example, the present invention may be configured so that if the mobile phone 2 is brought very close to the reader/writer 15 of the digital multi-function peripheral 1 when the digital multi-function peripheral 1 is set to the "via pattern", the reader/writer 15 sends the multi-function peripheral address and a flag indicating that communication is performed via the reader/writer 15 to the mobile phone 2. In this case, when establishing a connection between the digital multi-function peripheral 1 and the mobile phone 2 later, the mobile phone 2 sends the flag together with a connection establishment request to the digital multi-function peripheral 1. Then, the digital multi-function peripheral 1 decides whether the connection establishment request received from the mobile phone 2 is a request for connection establishment via the reader/writer 15 or a request for connection establishment of "direct pattern" by confirming whether or not the data corresponding to the connection establishment request includes the flag. In other words, if the flag is not confirmed even when "via pattern" is set, the digital multi-function peripheral 1 decides that the request is a request for connection establishment of "direct pattern", and rejects the connection establishment request. Such a configuration makes it possible to more accurately decide whether a received connection establishment request is a request for connection establishment of "via pattern", or "direct pattern".

The user of the digital multi-function peripheral 1 may select a method suitable for him/her from these setting methods to enable only a connection according to a connection method suitable for him/her. The present invention may be configured to allow a manager, instead of a user, to select a connection method. For instance, in the case of a rental digital multi-function peripheral installed in a convenience store, when the manager sets the digital multi-function peripheral to allow only "via pattern", even if a request for connection establishment by Bluetooth is made outside the store, this request is rejected, and therefore it is possible to enable only a customer using the digital multi-function peripheral inside the store to use Bluetooth communication via the reader/writer.

In the case where the digital multi-function peripheral is used in a limited environment, such as within a company, for example, if not only communication of "via pattern", but also communication of "direct pattern" is enabled, even when the user sits distant from the digital multi-function peripheral 1, he/she may establish a connection with the digital multi-function peripheral 1 without moving to the digital multi-function peripheral 1. As described above, since a connection method is selectable, it is possible to select a connection method suitable for the use situation or the installation situation of the digital multi-function peripheral 1, and it is also possible to enhance security performance.

Although the above description explains an example in which the mobile phone 2 sends data to the digital multi-function peripheral 1, the present invention is not limited to this. For example, document image data read by the scanner of the digital multi-function peripheral 1 may be sent to other digital multi-function peripheral, or facsimile image data, electronic data etc. stored in the storage section of the digital multi-function peripheral 1 may be sent to other digital multi-function peripheral. Further, if two or more communication means are provided like the reader/writer 15 and the wireless communication section 16 of the digital multi-function peripheral 1, it is possible to produce the same effects as those of the present invention.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A communication system having mobile terminal and an image forming apparatus that comprises a receiving section for receiving an image data from the mobile terminal and prints an image based on the received image data, wherein
    the image forming apparatus comprises a sending section that sends a communication address of the image forming apparatus to the mobile terminal,
    the image forming apparatus makes the receiving section receive an image data sent with the communication address of the image forming apparatus by the mobile terminal,
    a communication between the mobile terminal and the image forming apparatus is performed wirelessly with an IEEE 802.11 standard,
    the communication address of the image forming apparatus is uniquely associated with and identifies the image forming apparatus, the communication address of the image forming apparatus is used for printing the image based on the image data of the mobile terminal, the mobile terminal comprises:
- a data selection receiving section that receives a selection of an image data among plural thumbnails displayed on the display section; and
- an image data sending section that wirelessly sends the selected image data with the communication address of the image forming apparatus to the image forming apparatus, the image forming apparatus makes the receiving section receive the selected image data, when the selected image data is sent with the communication address of the image forming apparatus from the mobile terminal, the image forming apparatus does not respond to a connection establishment request from another mobile terminal except for the mobile terminal, when the wireless communication with the mobile terminal is established, and after the communication between the mobile terminal and the image forming apparatus is established with a non-contact wireless method by bringing the mobile terminal close to the image forming apparatus and holding the mobile terminal over the image forming apparatus in a state that the image is displayed on the mobile terminal, the image data related to the displayed image is outputted to the image forming apparatus with the IEEE 802.11 standard.

2. The communication system according to claim 1, wherein
the image forming apparatus comprises a deleting section that deletes an address of the mobile terminal when the communication with the mobile terminal through the receiving section is finished.

3. The communication system according to claim 1, wherein
the image forming apparatus comprises a notification section that wirelessly notifies error information to the mobile terminal when an error occurs, and
the notified error information is stored by the mobile terminal.

4. A communication method with a mobile terminal and an image forming apparatus that comprises a receiving section for receiving an image data from the mobile terminal and prints an image based on the received image data, wherein
the image forming apparatus sends a communication address of the image forming apparatus to the mobile terminal,
the image forming apparatus makes the receiving section receive an image data sent with the communication address of the image forming apparatus by the mobile terminal,
a communication between the mobile terminal and the image forming apparatus is performed wirelessly by an IEEE 802.11 standard,
the communication address of the image forming apparatus is uniquely associated with and identifies the image forming apparatus,
the communication address of the image forming apparatus is used for printing an image based on the image data of the mobile terminal,
the mobile terminal receives a selection of an image data among plural thumbnails displayed on a display section,
the mobile terminal wirelessly sends the selected image data with the communication address of the image forming apparatus to the image forming apparatus,
the image forming apparatus makes the receiving section receive the selected image data, when the selected image data is sent with the communication address of the image forming apparatus from the mobile terminal,
the image forming apparatus does not respond to a connection establishment request from another mobile terminal except for the mobile terminal, when the wireless communication with the mobile terminal is established, and
after the communication between the mobile terminal and the image forming apparatus is established with a non-contact wireless method by bringing the mobile terminal close to the image forming apparatus and holding the mobile terminal over the image forming apparatus in a state that the image is displayed on the mobile terminal, the image data related to the displayed image is outputted to the image forming apparatus with the IEEE 802.11 standard.

5. An image forming apparatus, comprising:
a sending section that wirelessly sends a communication address of the image forming apparatus to a mobile terminal with a IEEE 802.11 standard, wherein a receiving section receives an image data from the mobile terminal;
an image data receiving section that makes the receiving section receive an image data selected among plural thumbnails displayed on the mobile terminal, when the selected image data is wirelessly sent from the mobile terminal with the communication address of the image forming apparatus; and
a control section that does not respond to a connection establishment request from another mobile terminal except for the mobile terminal, when the wireless communication with the mobile terminal is established through the receiving section,
wherein the communication address of the image forming apparatus is uniquely associated with and identifies the image forming apparatus,
the communication address of the image forming apparatus is used for printing an image based on the image data of the mobile terminal, and
wherein after the communication between the mobile terminal and the image forming apparatus is established with a non-contact wireless method by bringing the mobile terminal close to the image forming apparatus and holding the mobile terminal over the image forming apparatus in a state that the image is displayed on the mobile terminal, the image data related to the displayed image is outputted to the image forming apparatus with the IEEE 802.11 standard.

6. The image forming apparatus according to claim 5, further comprising:
a deleting section that deletes an address of the mobile terminal when the communication with the mobile terminal through the receiving section is finished.

7. The image forming apparatus according to claim 5, further comprising:
a notification section that wirelessly notifies error information to the mobile terminal when an error occurs, and
the notified error information is stored by the mobile terminal.

* * * * *